United States Patent
Issa et al.

(10) Patent No.: US 9,098,167 B1
(45) Date of Patent: Aug. 4, 2015

(54) LAYERED VISUALIZATION OF CONTENT REPRESENTATIONS

(75) Inventors: Alfredo C. Issa, Apex, NC (US); Richard J. Walsh, Raleigh, NC (US); Christopher M. Amidon, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 2437 days.

(21) Appl. No.: 11/678,798

(22) Filed: Feb. 26, 2007

(51) Int. Cl.
*G06F 3/048* (2013.01)
*G06F 3/0481* (2013.01)

(52) U.S. Cl.
CPC ..... *G06F 3/04815* (2013.01); *A63F 2300/5553* (2013.01)

(58) Field of Classification Search
CPC ............ A63F 2300/5553; G06F 3/04815
USPC ......... 345/419; 455/457; 379/201.01, 202.01; 715/200, 706, 733, 757, 764, 848; 463/42
See application file for complete search history.

(56) References Cited

U.S. PATENT DOCUMENTS

| | | | |
|---|---|---|---|
| 5,420,606 A | | 5/1995 | Begum et al. |
| 5,736,982 A | * | 4/1998 | Suzuki et al. ............... 715/706 |
| 5,923,330 A | * | 7/1999 | Tarlton et al. ............... 345/419 |
| 6,256,043 B1 | * | 7/2001 | Aho et al. ..................... 345/629 |
| 6,349,301 B1 | | 2/2002 | Mitchell et al. |
| 6,453,294 B1 | | 9/2002 | Dutta et al. |
| 6,466,213 B2 | | 10/2002 | Bickmore et al. |
| 6,545,682 B1 | | 4/2003 | Ventrella et al. |
| 6,580,811 B2 | | 6/2003 | Maurer et al. |
| 6,629,136 B1 | * | 9/2003 | Naidoo ......................... 709/219 |
| 6,647,269 B2 | | 11/2003 | Hendrey et al. |
| 6,672,961 B1 | * | 1/2004 | Uzun ............................. 463/31 |
| 6,772,195 B1 | | 8/2004 | Hatlelid et al. |
| 6,795,972 B2 | | 9/2004 | Rovira |
| 6,854,012 B1 | * | 2/2005 | Taylor ......................... 709/224 |
| 6,910,186 B2 | | 6/2005 | Kim |
| 6,948,131 B1 | | 9/2005 | Neven et al. |
| 7,006,098 B2 | | 2/2006 | Bickmore et al. |

(Continued)

FOREIGN PATENT DOCUMENTS

| | | |
|---|---|---|
| EP | 1473650 A1 | 3/2004 |
| EP | 1689143 A1 | 10/2004 |

(Continued)

OTHER PUBLICATIONS

No Author, "Botme.com—java mobile games, mobile games, java games, V-girl, V-boy, V-Penguins," (website), obtained Jul. 25, 2007, 2 pages, http://www.botme.com/portal/, main page only.

(Continued)

*Primary Examiner* — Thu Huynh
(74) *Attorney, Agent, or Firm* — Withrow & Terranova, PLLC

(57) ABSTRACT

A system and method for representing content available from a hosting user are provided. In general, content representations that are descriptive of content made accessible by the hosting user are presented in association with a content representation host representing the hosting user according to a layering scheme. The content representation host may be, for example, an avatar in a virtual environment, a custom webpage of the hosting user, an identifier of the hosting user in a peer-to-peer (P2P) network, an identifier of the hosting user in a mobile network, or the like. Based on the content representations, other users are enabled to quickly and easily determine whether content of interest is accessible from the hosting user.

19 Claims, 15 Drawing Sheets

(56) References Cited

U.S. PATENT DOCUMENTS

| | | | |
|---|---|---|---|
| 7,034,678 B2 | 4/2006 | Burkley et al. | |
| 7,036,082 B1 | 4/2006 | Dalrymple et al. | |
| 7,107,549 B2* | 9/2006 | Deaton et al. | 715/836 |
| 7,145,898 B1 | 12/2006 | Elliott | |
| 7,155,210 B2 | 12/2006 | Benson | |
| 7,216,002 B1 | 5/2007 | Anderson | |
| 7,248,677 B2* | 7/2007 | Randall et al. | 379/93.23 |
| 7,396,281 B2* | 7/2008 | Mendelsohn et al. | 463/42 |
| 7,483,958 B1 | 1/2009 | Elabbady et al. | |
| 7,614,016 B2 | 11/2009 | Wong et al. | |
| 7,840,903 B1 | 11/2010 | Amidon et al. | |
| 7,849,420 B1 | 12/2010 | Amidon et al. | |
| 2001/0021920 A1* | 9/2001 | Ikeda | 705/26 |
| 2002/0033848 A1 | 3/2002 | Sciammarella et al. | |
| 2002/0072922 A1 | 6/2002 | Suzuki et al. | |
| 2002/0085031 A1 | 7/2002 | Conrado et al. | |
| 2002/0095333 A1 | 7/2002 | Jokinen et al. | |
| 2002/0113820 A1 | 8/2002 | Robinson et al. | |
| 2002/0123355 A1 | 9/2002 | Hosono | |
| 2002/0151327 A1 | 10/2002 | Levitt | |
| 2002/0156875 A1 | 10/2002 | Pabla | |
| 2002/0171647 A1 | 11/2002 | Sterchi et al. | |
| 2003/0005439 A1 | 1/2003 | Rovira et al. | |
| 2003/0028451 A1 | 2/2003 | Ananian | |
| 2003/0028621 A1 | 2/2003 | Furlong et al. | |
| 2003/0051255 A1* | 3/2003 | Bulman et al. | 725/135 |
| 2003/0079177 A1 | 4/2003 | Brintzenhofe et al. | |
| 2003/0101450 A1 | 5/2003 | Davidsson et al. | |
| 2003/0154212 A1 | 8/2003 | Schirmer et al. | |
| 2003/0174178 A1 | 9/2003 | Hodges | |
| 2003/0187984 A1 | 10/2003 | Banavar et al. | |
| 2003/0204846 A1 | 10/2003 | Breen et al. | |
| 2004/0015562 A1* | 1/2004 | Harper et al. | 709/217 |
| 2004/0073924 A1 | 4/2004 | Pendakur | |
| 2004/0078432 A1 | 4/2004 | Manber et al. | |
| 2004/0125136 A1 | 7/2004 | Wallenios | |
| 2004/0135820 A1 | 7/2004 | Deaton et al. | |
| 2004/0179039 A1 | 9/2004 | Blattner et al. | |
| 2004/0189701 A1 | 9/2004 | Badt, Jr. | |
| 2004/0193673 A1 | 9/2004 | Samji et al. | |
| 2004/0199867 A1 | 10/2004 | Brandenborg | |
| 2004/0239681 A1 | 12/2004 | Robotham et al. | |
| 2004/0240652 A1* | 12/2004 | Kanada | 379/201.1 |
| 2005/0010637 A1* | 1/2005 | Dempski et al. | 709/204 |
| 2005/0015725 A1 | 1/2005 | Matsuda | |
| 2005/0030309 A1 | 2/2005 | Gettman et al. | |
| 2005/0050079 A1 | 3/2005 | Plastina et al. | |
| 2005/0060746 A1 | 3/2005 | Kim | |
| 2005/0131761 A1 | 6/2005 | Trika et al. | |
| 2005/0132420 A1 | 6/2005 | Howard et al. | |
| 2005/0137015 A1 | 6/2005 | Rogers et al. | |
| 2005/0159970 A1 | 7/2005 | Buyukkokten et al. | |
| 2005/0165795 A1 | 7/2005 | Myka et al. | |
| 2005/0179685 A1 | 8/2005 | Kake et al. | |
| 2005/0198353 A1 | 9/2005 | Zmrzli | |
| 2005/0210387 A1 | 9/2005 | Alagappan et al. | |
| 2005/0264647 A1 | 12/2005 | Rzeszewski et al. | |
| 2006/0004799 A1 | 1/2006 | Wallender | |
| 2006/0020973 A1 | 1/2006 | Hannum et al. | |
| 2006/0053194 A1 | 3/2006 | Schneider et al. | |
| 2006/0059509 A1 | 3/2006 | Huang et al. | |
| 2006/0064645 A1 | 3/2006 | Neven et al. | |
| 2006/0111188 A1 | 5/2006 | Winkler | |
| 2006/0116987 A1* | 6/2006 | Bernard | 707/3 |
| 2006/0148512 A1 | 7/2006 | Ekholm et al. | |
| 2006/0161635 A1 | 7/2006 | Lamkin et al. | |
| 2006/0184579 A1 | 8/2006 | Mills et al. | |
| 2006/0195515 A1* | 8/2006 | Beaupre et al. | 709/203 |
| 2006/0217201 A1 | 9/2006 | Berstis et al. | |
| 2006/0218225 A1 | 9/2006 | Hee Voon et al. | |
| 2006/0235790 A1 | 10/2006 | Jung et al. | |
| 2006/0242234 A1 | 10/2006 | Counts et al. | |
| 2006/0242581 A1 | 10/2006 | Manion et al. | |
| 2006/0271997 A1 | 11/2006 | Jacoby et al. | |
| 2006/0277474 A1* | 12/2006 | Robarts et al. | 715/745 |
| 2006/0282391 A1 | 12/2006 | Peterka et al. | |
| 2006/0282516 A1 | 12/2006 | Taylor et al. | |
| 2007/0011273 A1 | 1/2007 | Greenstein et al. | |
| 2007/0011617 A1 | 1/2007 | Akagawa et al. | |
| 2007/0013701 A1* | 1/2007 | Segawa et al. | 345/502 |
| 2007/0082738 A1 | 4/2007 | Fickie et al. | |
| 2007/0094691 A1 | 4/2007 | Gazdzinski | |
| 2007/0106526 A1 | 5/2007 | Jung et al. | |
| 2007/0127889 A1 | 6/2007 | Seo | |
| 2007/0156726 A1 | 7/2007 | Levy | |
| 2007/0184855 A1* | 8/2007 | Klassen et al. | 455/457 |
| 2007/0198364 A1 | 8/2007 | Quoc et al. | |
| 2007/0204287 A1 | 8/2007 | Conradt et al. | |
| 2007/0207860 A1 | 9/2007 | Yamauchi et al. | |
| 2007/0223675 A1* | 9/2007 | Surin et al. | 379/202.01 |
| 2007/0287498 A1 | 12/2007 | Wang et al. | |
| 2007/0288470 A1 | 12/2007 | Kauniskangas et al. | |
| 2007/0299681 A1 | 12/2007 | Plastina et al. | |
| 2007/0299737 A1 | 12/2007 | Plastina et al. | |
| 2008/0009268 A1 | 1/2008 | Ramer et al. | |
| 2008/0052242 A1 | 2/2008 | Merritt et al. | |
| 2008/0059422 A1 | 3/2008 | Tenni et al. | |
| 2008/0091521 A1 | 4/2008 | Ho et al. | |
| 2008/0104114 A1 | 5/2008 | Kasperkiewicz et al. | |
| 2008/0201638 A1* | 8/2008 | Nair | 715/706 |
| 2008/0222295 A1 | 9/2008 | Robinson et al. | |
| 2008/0257134 A1 | 10/2008 | Oppenheimer | |
| 2009/0031006 A1 | 1/2009 | Johnson | |
| 2009/0037822 A1 | 2/2009 | Kandekar et al. | |
| 2009/0119614 A1 | 5/2009 | Tienvieri et al. | |
| 2010/0131584 A1 | 5/2010 | Johnson | |
| 2010/0267398 A1 | 10/2010 | Kim et al. | |

FOREIGN PATENT DOCUMENTS

| | | |
|---|---|---|
| WO | WO 02/21831 A2 | 3/2002 |
| WO | WO 02/057972 A2 | 7/2002 |
| WO | WO 2004/036902 A1 | 4/2004 |
| WO | WO 2005/020129 A2 | 3/2005 |
| WO | WO 2006/036207 A1 | 4/2006 |

OTHER PUBLICATIONS

No Author, "Skype to Debut New Avatar Product From Comverse: Klonies," (press release), Jun. 7, 2006, 3 pages, http://www.comverse.com/press_releases.aspx?newsId=412.

Press Releases Comverse, http://www.comverse.com/press_releases.aspx?newsId=412, Obtained May 17, 2007.

Personalise Skype—Invent Yourself, http://skype.klonies.com/studio.php, Obtained May 17, 2007.

Gravatar—Globally Recognized Avatars, http://site.gravatar.com/, main page only, Obtained May 17, 2007.

Cyworld, http://us.cyworld.com/main/index.php, Obtained May 17, 2007.

Youniversal Branding, http://www.trendwatching.com/trends/YOUNIVERSALBRANDING.htm, Obtained May 17, 2007.

Avatars—Yahoo! Messenger, http://messenger.yahoo.com/avatars.php, Obtained May 17, 2007.

Luskwood Creatures, http://www.luskwood.com/index.htm, Obtained May 17, 2007.

Meez—Avatars for MySpace, Xanga and IM, http://mashable.com/2006/08/22/meez-avatars-for-myspace-xanga-and-im/, main page only, obtained May 17, 2007.

MySpace, http://www.myspace.com, main page only, obtained May 31, 2007.

Rana El Kaliouby and Peter Robinson, "FAIM: Integrating Automated Facial Affect Analysis in Instant Messaging," In Proceedings of ACM International Conference on Intelligent User Interfaces (IUI), pp. 244-246, 2004.

Pandora Radio, http://www.pandora.com, main page only, obtained May 31, 2007.

Rhapsody—Free access to millions of songs online, http://www.rhapsody.com/home.html, Obtained May 31, 2007.

(56) References Cited

OTHER PUBLICATIONS

Smith, Steve; "Tapping the Feed: in search of an RSS Money Trail" Econtent; Mar. 2005; vol. 28, Issue 3; p. 30-34.

Krol, Carol; "RSS ad programs feed needs" B to B; Jul. 11, 2005; vol. 90 Issue 9; p. 1-33.

International Search Report and Written Opinion mailed Nov. 13, 2008, for PCT/US08/74140, 13 pages.

Robinson, Jack et al., "Using Internet Content As the Means to Establish Social Networks by Linking Internet Users, Searchers, Viewers and/or Listeners of the Same and/or Similar Internet Content to Each Other Via a Platform That Enables Any of the Following in N-Dimensional Environments; Social Networking, Communications, Sharing, Co-Browsing, E-Commerce, Advertising, Search, Hosting and Registry Services, Push and Pull Applications Anonymous Communications, and Rich Presence." 132 pages.

* cited by examiner

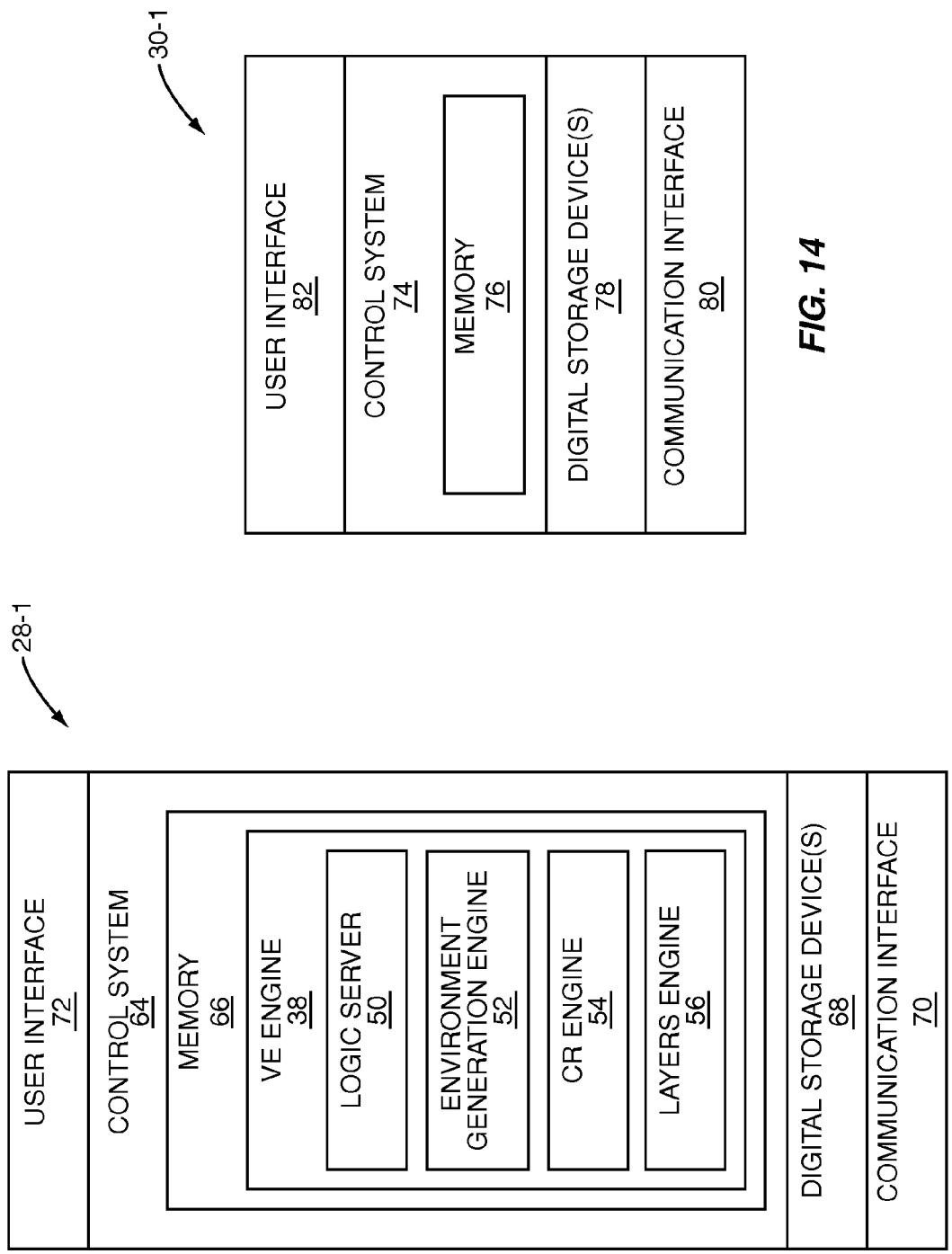

LAYERED VISUALIZATION OF CONTENT REPRESENTATIONS

FIELD OF THE INVENTION

The present invention relates to a system and method for providing content representations indicative of content shared by or otherwise made accessible by a host.

BACKGROUND OF THE INVENTION

There are many environments where users interact with each other and, as part of the interaction, share content. These environments include, for example, gaming, virtual worlds, online content sharing or social networking sites, and the like. One issue with these environments is that shared content is not portrayed in a way that is intuitive for content sharing. Users must often dive deep into content folders or user profiles only to discover that the content is of no interest. Thus, there is a need for a system and method for representing content shared or otherwise made available in such environments in a manner that enables users to intuitively identify other users having content of interest.

SUMMARY OF THE INVENTION

The present invention provides a system and method for representing content available from a hosting user. In general, content representations that are descriptive of content made accessible by the hosting user are presented in association with a content representation host representing the hosting user according to a layering scheme. The content representation host may be, for example, an avatar in a virtual environment, a custom webpage of the hosting user, an identifier of the hosting user in a peer-to-peer (P2P) network, an identifier of the hosting user in a mobile network, or the like. Using the layering scheme, depending on the particular embodiment, the content representations presented in association with the content representation host are selected based on distance indicia providing either a relative distance between avatars, or other content representation hosts, representing the hosting user and a viewing user or a relative distance between the hosting user and the viewing user. The relative distance between the hosting user and the viewing user may be, for example, a physical distance between the users, a number of hops between the users in a network, logical hops between the users in an overlay network, a distance between the users in a social network, or the like. Based on the content representations, other users are enabled to quickly and easily determine whether content of interest is accessible from the hosting user.

In one embodiment, the hosting user is represented by an avatar in a virtual environment. Applicable content representations descriptive of the content made accessible by the hosting user are identified, and a number of content representation (CR) layers are formed where each layer is associated with one or more of the applicable content representations and a distance threshold. Based on a distance between the avatar of the hosting user and an avatar of a viewing user in the virtual environment, one of the CR layers is selected. The one or more content representations associated with the selected CR layer are then presented in association with the avatar of the hosting user in a view of the virtual environment provided to the viewing user. The content representations may be implemented as visual elements or graphics presented alongside the avatar of the hosting user or implemented as modifications to the appearance of the avatar of the hosting user.

For example, if the hosting user is sharing music of the Rock genre and the distance between the two avatars in the virtual environment is large, a content representation indicative of music may be presented to the viewing user in association with the avatar of the hosting user. As the distance between the two avatars decreases, the content representation may be changed to a content representation indicative of the Rock genre. If the distance is further decreased, content representations of one or more artists may be presented. Based on the content representations, the viewing user is enabled to quickly and easily determine whether content of interest is accessible from the hosting user by approaching the avatar of the hosting user in the virtual environment.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 13 is a block diagram of an exemplary embodiment of one of the virtual environment servers of FIG. 3 according to one embodiment of the present invention;

FIG. 14 is a block diagram of an exemplary embodiment of one of the client devices of FIG. 3 according to one embodiment of the present invention;

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to a system and method for representing content available from a hosting user. In general, content representations that are descriptive of content made accessible by the hosting user are presented in association with a content representation host representing the hosting user according to a layering scheme. The content representation host may be, for example, an avatar in a virtual environment, a custom webpage of the hosting user, an identifier of the hosting user in a peer-to-peer (P2P) network, an identifier of the hosting user in a mobile network, or the like. Based on the content representations, other users are enabled to quickly and easily determine whether content of interest is accessible from the hosting user.

In one embodiment, the hosting user is represented by an avatar in a virtual environment. Applicable content representations descriptive of the content made accessible by the hosting user are identified, and a number of content representation (CR) layers are formed where each layer is associated with one or more of the applicable content representations and a distance threshold. Based on a distance between the avatar of the hosting user and an avatar of a viewing user in the virtual environment, one of the CR layers is selected. The one or more content representations associated with the selected CR layer are then presented in association with the avatar of the hosting user in a view of the virtual environment provided to the viewing user. The content representations may be implemented as visual elements or graphics presented alongside the avatar of the hosting user or implemented as modifications to the appearance of the avatar of the hosting user.

Figure 1B:
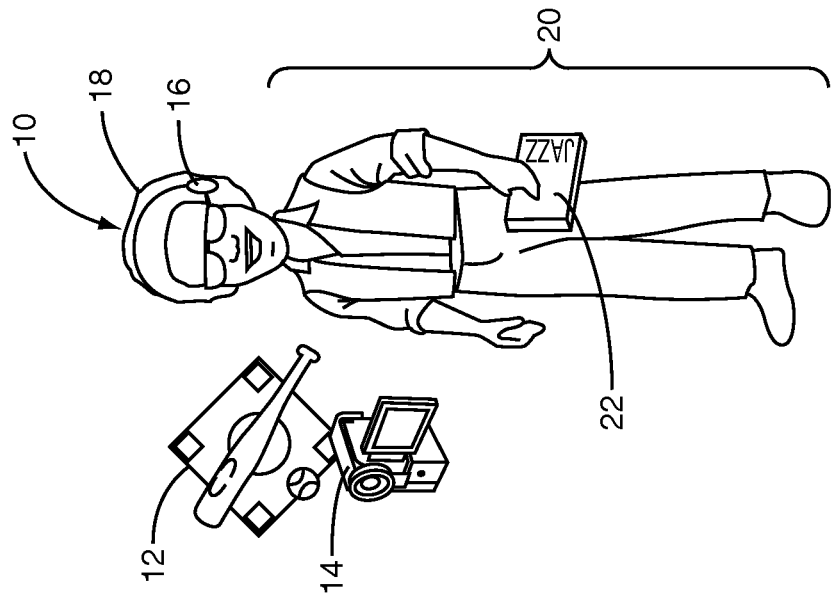
FIGS. 1A and 1B illustrate an exemplary avatar without and with associated content representations according to one embodiment of the present invention.
Figure 1A:
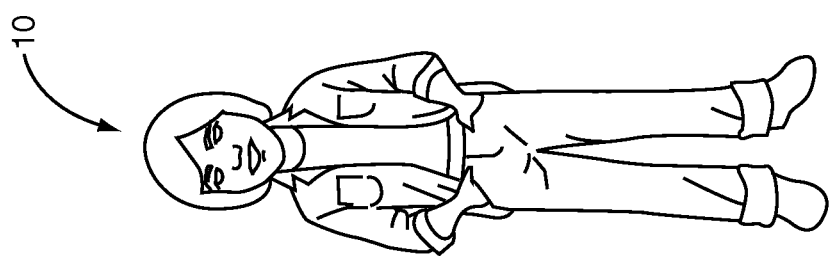

FIGS. 1A and 1B illustrate an exemplary avatar 10 representing a user in a virtual environment according to one embodiment of the present invention. An avatar is a representation of a user in the form of a three-dimensional model, a two-dimensional icon, or the like. FIG. 1A illustrates the avatar 10 without any associated content representations.

FIG. 1B illustrates the avatar 10 having associated content representations 12-22. Content representation 12 is a graphic including a baseball diamond, baseball, and bat and indicates that content related to baseball is available from a hosting user represented by the avatar 10. Content representation 14 is a video camera and indicates that video content is available from the hosting user represented by the avatar 10. Together, the content representations 12 and 14 indicate that video content related to baseball is available from the hosting user represented by the avatar 10. Note that while the content representations 12 and 14 of FIG. 2B are presented alongside the avatar 10, the present invention is not limited thereto. The content representations 12 and 14 may be presented anywhere in the view of the virtual environment presented to the viewing user or in a separate window.

While the content representations 12 and 14 are presented near the avatar 10, content representations may additionally or alternatively be presented by modifying the appearance of the avatar 10. In this example, a content representation 16 is presented by modifying the avatar 10 such that the avatar 10 is wearing headphones. The headphones may indicate that audio content, such as songs, is available from the hosting user represented by the avatar 10. In addition, content representations 18 and 20 are presented by modifying the hairstyle and clothing of the avatar 10. In a similar fashion, content representation 22 is a "Jazz" book appearing in the hand of the avatar 10. Together, the content representations 18-22 may indicate that content related to the "Jazz" genre is available from the hosting user represented by the avatar 10. Further, the combination of the content representations 16-22 may indicate that audio content from the "Jazz" genre is available from the hosting user represented by the avatar 10.

As discussed below, numerous content representations may be applicable to or descriptive of the content made accessible by a hosting user. Thus, it may be desirable to limit or control which of the applicable content representations are presented in association with the avatar representing the hosting user in the virtual environment.

Figure 2:
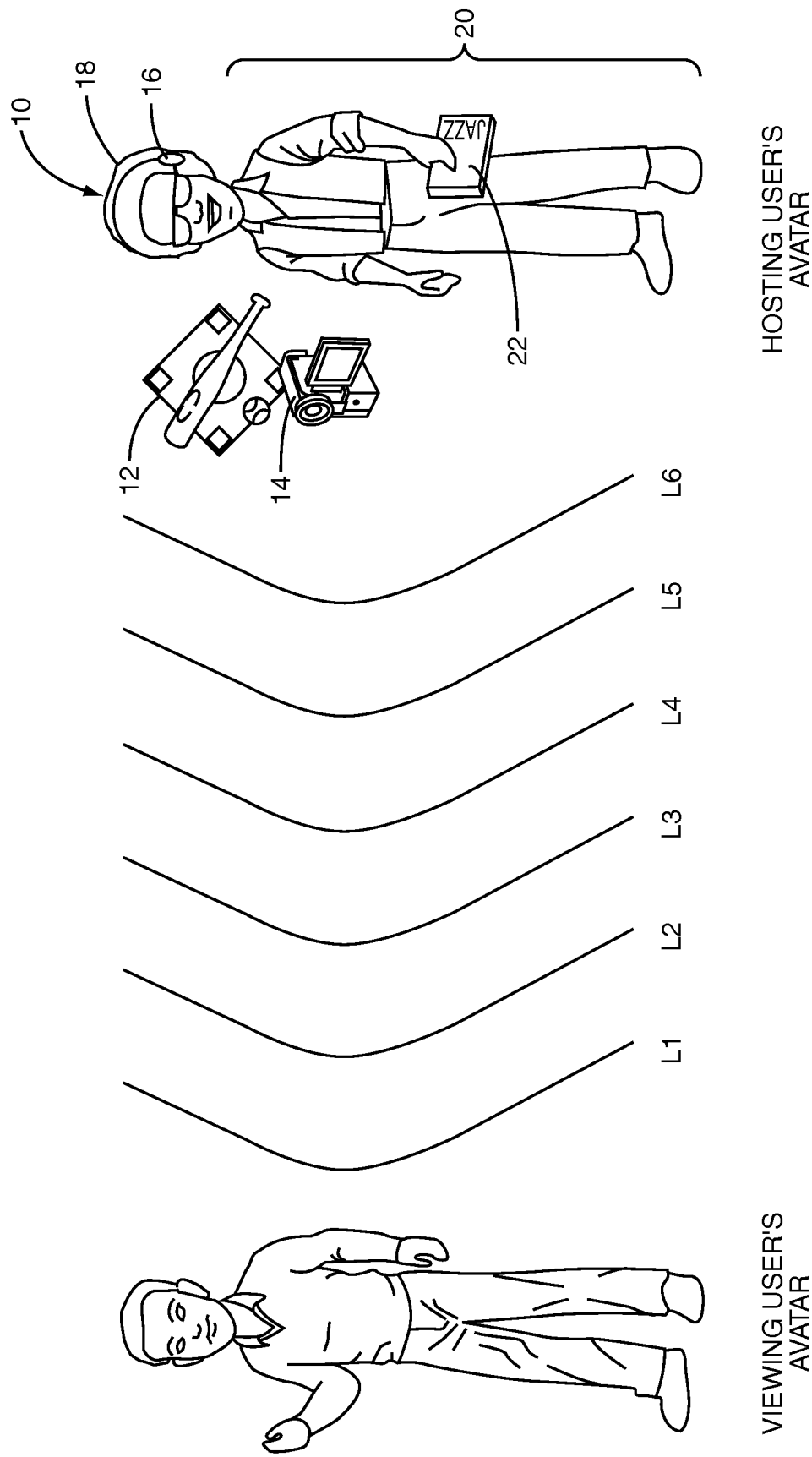
FIG. 2 illustrates a layering technique for presenting content representations to a viewing user in association with an avatar of a hosting user according to one embodiment of the present invention.

Accordingly, the present invention provides a layering technique for controlling which of the applicable content representations are presented in association with the avatar of a hosting user. FIG. 2 provides an overview of one embodiment of the layering technique of the present invention. First, a number of content representation (CR) layers (L1-L6) between an avatar of a hosting user and an avatar of a viewing user are defined based on various criteria, as discussed below. Each CR layer corresponds to a distance between the avatars in the virtual environment. Thus, the first CR layer (L1) corresponds to a greater distance between the two avatars than does the sixth CR layer (L6). Each of the CR layers (L1-L6) is associated with one or more applicable content representations that are descriptive of the content made accessible by the hosting user. Generally, the first CR layer (L1), which corresponds to the greatest distance between the two avatars, is associated with one or more high level content representations such as a music content representation. In contrast, the sixth CR layer (L6), which corresponds to the least distance between the two avatars, is associated with one or more low level content representations such as an artist content representation. Thus, the specificity of the content representation(s) presented in association with the avatar of the hosting user increases as the distance between the avatars in the virtual environment decreases.

For example, as the avatar of the viewing user approaches the avatar of the hosting user or vice versa, the content representation presented in association with the avatar of the hosting user may start as a content representation indicative of music when a distance between the two avatars is less than a distance threshold for the first CR layer (L1) and greater than a distance threshold for the second CR layer (L2). If the viewing user is interested, the viewing user may control his avatar to approach the avatar of the hosting user. As the distance between the two avatars decreases, the content representation changes to a content representation indicative of the "Jazz" genre when the distance between the two avatars is less than the distance threshold for the second CR layer (L2) and greater than a distance threshold for the third CR layer (L3). The content representation changes to a content representation indicative of the "West Coast" sub-genre when the distance between the two avatars is less than the distance threshold for the third CR layer (L3) and greater than a distance threshold for the fourth CR layer (L4). The content representation changes to a content representation indicative of the "Cool Jazz" sub-genre when the distance between the two avatars is less than the distance threshold for the fourth CR layer (L4) and greater than a distance threshold for the fifth CR layer (L5). The content representation changes to a content representation indicative of the 1950s sub-genre when the distance between the two avatars is less than the distance threshold for the fifth CR layer (L5) and greater than a distance threshold for the sixth CR layer (L6). The content representation changes to content representations of Miles Davis and Chet Baker when the distance between the two avatars is less than the distance threshold for the sixth CR layer (L6).

Figure 3:
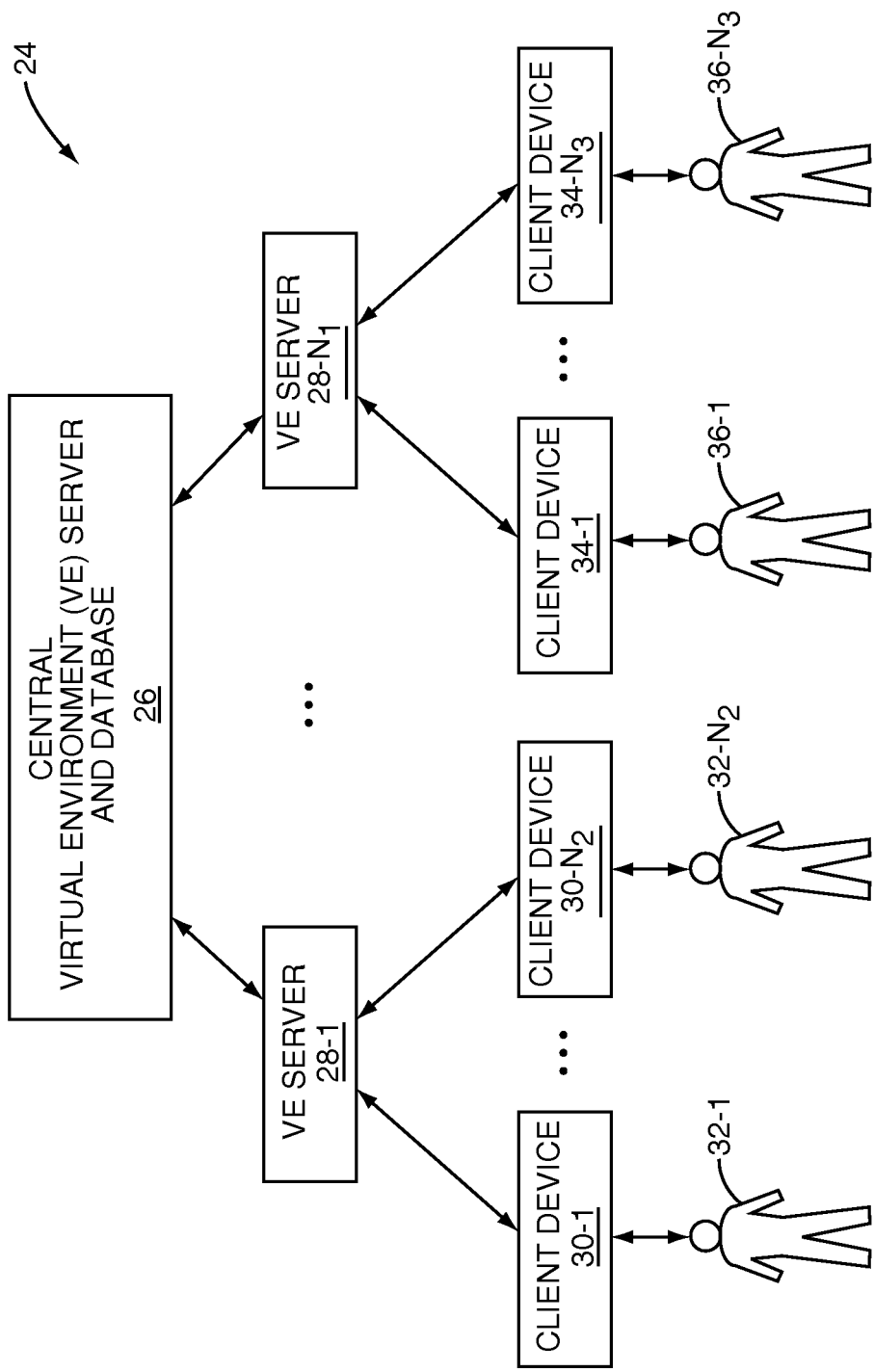
FIG. 3 illustrates a exemplary embodiment of a system providing content representations in a virtual environment according to one embodiment of the present invention.

FIG. 3 illustrates an exemplary embodiment of a system 24 providing a virtual environment in which content representations are implemented according to one embodiment of the present invention. It should be noted that the system 24 of FIG. 3 is exemplary and not intended to limit the scope of the present invention. The virtual environment may be a virtual world such as, for example, SECOND LIFE™ or a virtual gaming environment such as a Massively Multiplayer Online Role Playing Game (MMORPG).

In general, the system 24 includes a central virtual environment (VE) server and database 26 and a number of distributed VE servers 28-1 through 28-$N_1$. The VE server 28-1 serves a number of client devices 30-1 through 30-$N_2$ having associated users 32-1 through 32-$N_2$. Likewise, the VE server 28-$N_1$ serves a number of client devices 34-1 through 34-$N_3$ having associated users 36-1 through 36-$N_3$. The central VE server and database 26 manages user accounts and may also manage overall game logic and the like. The VE servers 28-1 through 28-$N_1$ manage interactions and user events and provide a client specific view of the virtual environment to the client devices 30-1 through 30-$N_2$ and 34-1 through 34-$N_3$. The client devices 30-1 through 30-$N_2$ and 34-1 through 34-$N_3$ may be, for example, personal computers, mobile devices such as mobile telephones or Personal Digital Assistants (PDAs), game consoles, or the like and generally include either a custom software application or a web browser enabling interaction with the VE servers 28-1 through 28-$N_1$ for participation in the virtual environment.

Note that in an alternative embodiment, the operation of the central VE server and database 26 and optionally the VE servers 28-1 through 28-$N_1$ may be distributed among the other devices in the system 24. For example, the operation of the central VE server and database 26 may be distributed among the VE servers 28-1 through 28-$N_1$. As another example, the operation of the central VE server and database 26 and the VE servers 28-1 through 28-$N_1$ may be distributed among the client devices 30-1 through 30-$N_2$ and 34-1 through 34-$N_3$.

According to one embodiment of the present invention, the users 32-1 through 32-$N_2$ and 36-1 through 36-$N_3$ are represented by avatars in the virtual environment. Further, in order to enable, for example, the user 32-1 to locate others of the users 32-2 through 32-$N_2$ and 36-1 through 36-$N_3$ sharing or otherwise making accessible content of interest to the user 32-1, the system 24 effects presentation of content representations in association with the avatars of the users 32-1 through 32-$N_2$ and 36-1 through 36-$N_3$. The avatars are more generally referred to herein as content representation hosts. In addition or alternatively, content representations may be associated with other virtual objects in the virtual environment such as, for example, storefronts in the virtual environment, a virtual stereo of a user in the virtual environment, or the like, where the virtual objects may provide access to shared or otherwise available content.

The content representations are descriptive of content shared or otherwise made accessible by the users 32-1 through 32-$N_2$ and 36-1 through 36-$N_3$ from the client devices 30-1 through 30-$N_2$ and 34-1 through 34-$N_3$. The content may be audio content such as songs or music; video content such as movies, television programs, or video clips; pictures; or the like. While this disclosure focuses on the aforementioned types of content, the present invention is not limited thereto. The content may additionally or alternatively be any other type of digital content such as, for example, user profiles, activities or interaction events in the virtual environment, hobbies, or the like.

The content representations may be indicative of, for example, content type such as music, video, picture, or the like; genre such as music genre, movie genre, or television program genre; artist such as music artist, actor, or actress; time period of release; acoustic styles; keywords; or the like. In addition, the content representations may be indicative of content quality, quantity of content, availability or accessibility, copyright or Digital Rights Management (DRM) restrictions, or the like or any combination thereof.

Note that the content made accessible by the users 32-1 through 32-$N_2$ and 36-1 through 36-$N_3$ is generally hosted by the client devices 30-1 through 30-$N_2$ and 34-1 through 34-$N_3$. However, the content may alternatively be hosted by, for example, the central VE server and database 26, one or more of the VE servers 28-1 through 28-$N_1$, a third party server such as a server providing a centrally hosted content sharing service, a P2P content sharing service, or the like or any combination thereof.

Figure 4:
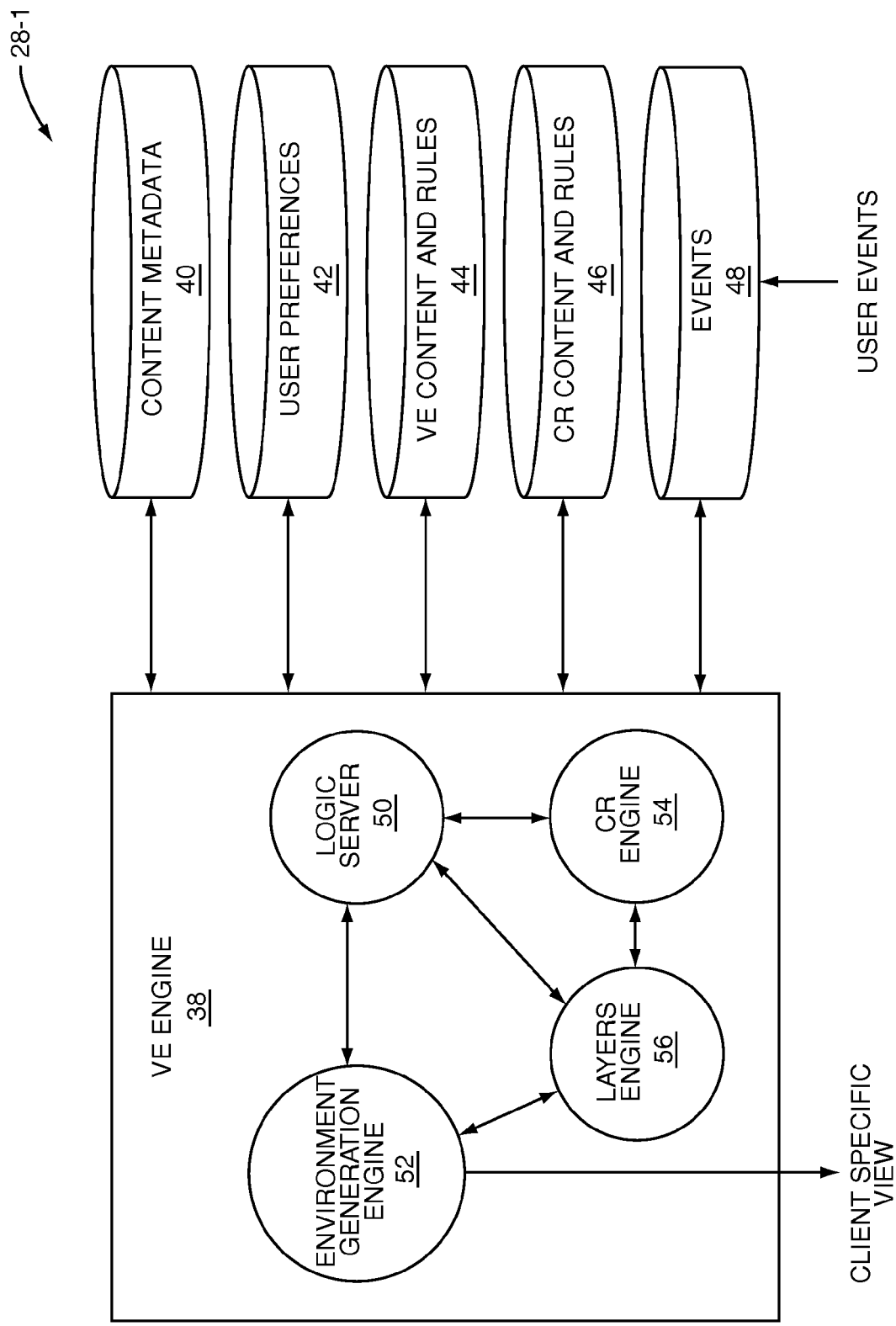
FIG. 4 illustrates a virtual environment server including a content representation engine and a layers engine according to one embodiment of the present invention.

FIG. 4 illustrates the VE server 28-1 of FIG. 3 according to one embodiment of the present invention. As illustrated, the VE server 28-1 includes a VE engine 38 and a number of databases 40-48. The databases 40-48 include a content metadata database 40, a user preferences database 42, a VE content and rules database 44, a content representation (CR) content and rules database 46, and an events database 48. In this embodiment, the content metadata database 40 includes content metadata describing content items shared by or otherwise made accessible by each of the users 32-1 through 32-$N_2$ and 36-1 through 36-$N_3$. As used herein, a content item is a song, movie, television program, video clip, picture, or the like. The content metadata may vary depending on the type of content item. For example, for each song, the content metadata may include the title of the song, the album on which the song was released, the artist of the song, the release date of the song, genre or classification, information defining the quality of the song such as the encoding parameters used to encode the song, and DRM or copyright restrictions. In addition, the content metadata may include availability or accessibility information such as information reflecting a connection speed of the associated client device hosting the song, estimated download time, a reference or Uniform Resource Locator (URL) providing access to the associated content, or the like.

The user preferences database 42 stores user preferences for each of the users 32-1 through 32-$N_2$ and 36-1 through 36-$N_3$. The user preferences may include, for example, one or more preferred types of content; one or more preferred genres such as one or more preferred music genres, movie genres, or television program genres; one or more preferred time periods; one or more other classifications of content; one or more preferred artists such as one or more preferred music artists, actors, or actresses; one or more preferred acoustic styles; a preferred quality level or preferred range of quality levels; one or more preferred availability or accessibility parameters such as a preferred connection speed or estimated download time; a preferred quantity of content to be available from a host before a corresponding content representation is presented to the user; and preferred DRM or copyright restriction parameters.

As for the databases 44 and 46, the VE content and rules database 44 stores content and rules required for the operation of the virtual environment. The CR content and rules database 46 stores graphics or information corresponding to the content representations and associated rules defining when the content representations are applicable. As discussed below, in one embodiment, the CR content and rules database 46 is an ontology where each node in the ontology is a content descriptor and is associated with one or more content representations and one or more rules. The ontology including the nodes of the ontology, the content representations associated with the nodes of the ontology, and the rules for the nodes of the ontology may be defined by an operator of the system 24, based on contributions from the users 32-1 through 32-$N_2$ and 36-1 through 36-$N_3$, or the like or any combination thereof. Note that while an ontology is discussed herein, any similar data structure such as a linked list, taxonomy, or the like may be used.

The events database 48 stores incoming user events from the client devices 30-1 through 30-$N_2$ and 34-1 through 34-$N_3$. The user events may be any user event permitted in the virtual environment. For example, the user event may be related to movement of the user's avatar within the virtual environment or entry of the avatar into the virtual environment.

The VE engine 38 may be implemented in software, hardware, or a combination thereof. In general, the VE engine 38 operates to provide a client specific view of the virtual environment to each of the client devices 30-1 through 30-$N_2$ and 34-1 through 34-$N_3$ based on user events received from the client devices 30-1 through 30-$N_2$ and 34-1 through 34-$N_3$. The VE engine 38 includes a logic server 50, an environment generation engine 52, a content representation (CR) engine 54, and a layers engine 56. Note that the layers engine 56 may alternatively be incorporated into the CR engine 54. Using the VE content and rules database 44, the logic server 50 and the environment generation engine 52 operate to process user events from the client devices 30-1 through 30-$N_2$ and 34-1 through 34-$N_3$ and provide client specific views of the virtual environment to the client devices 30-1 through 30-$N_2$ and 34-1 through 34-$N_3$. Using the CR content and rules database 46, the CR engine 54 and the layers engine 56 interact with the logic server 50 and the environment generation engine 52 to effect presentation of content representations within the virtual environment according to the present invention.

Figure 5:
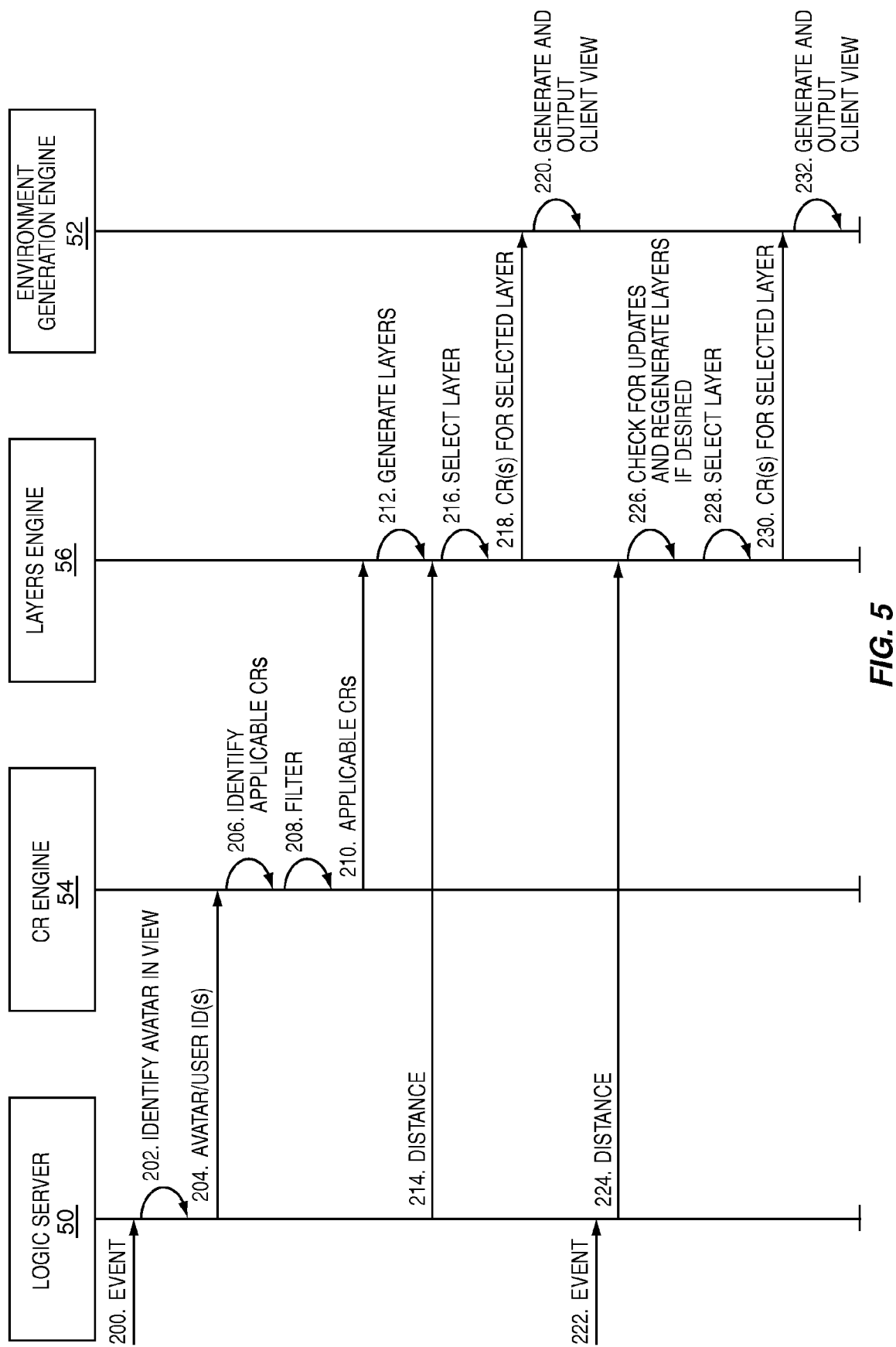
FIG. 5 illustrates the operation of the virtual environment server of FIG. 4 according to one embodiment of the present invention.

FIG. 5 illustrates the operation of the VE engine 38 and particularly the operation of the CR engine 54 and the layers engine 56 to effect presentation of content representations in the virtual environment. First, the logic server 50 receives a user event (step 200). For this example, assume that the user event relates to movement of the avatar of the user 32-1 in the virtual environment. The user event may alternatively be the movement of the avatar of one or more other users into the view of the user 32-1 in the virtual environment. Upon receiving the user event, the logic server 50 identifies an avatar of one of the other users 32-2 through 32-$N_2$ and 36-1 through 36-$N_3$ that is within the view of the user 32-1 in the virtual environment (step 202). For this example, assume that only the avatar of the user 36-1 is within the view of the user 32-1. Note that while only one avatar within the view of the user 32-1 is discussed in this example, any number of avatars may be within the view of the user 32-1. Also note that the user 32-1 is also referred to herein as the viewing user and that the user 36-1 is also referred to herein as the hosting user. The logic server 50 then provides information identifying the viewing user 32-1 and the hosting user 36-1 to the CR engine 54 (step 204).

At this point, the CR engine 54 identifies one or more applicable content representations for the content made accessible by the hosting user 36-1 (step 206). More specifically, the CR engine 54 first processes the content metadata describing the content made available by the hosting user 36-1 based on the CR rules from the CR content and rules database 46 to determine which content representations are applicable to the content made available by the hosting user 36-1. The CR content and rules database 46 may include an ontology providing a defined set of content representations. Each node in the ontology corresponds to a content descriptor such as, for example, a content type, genre, artist, time period, or the like. Each node has one or more associated content representations and one or more rules defining when the content representation(s) for the node are applicable. By comparing the content metadata to the rules, the CR engine 54 determines which nodes of the ontology and thus which content representations are applicable to the content made available by the hosting user 36-1. Again, while an ontology is discussed herein, any similar data structure such as a linked list, taxonomy, or the like may be used.

Figure 6:
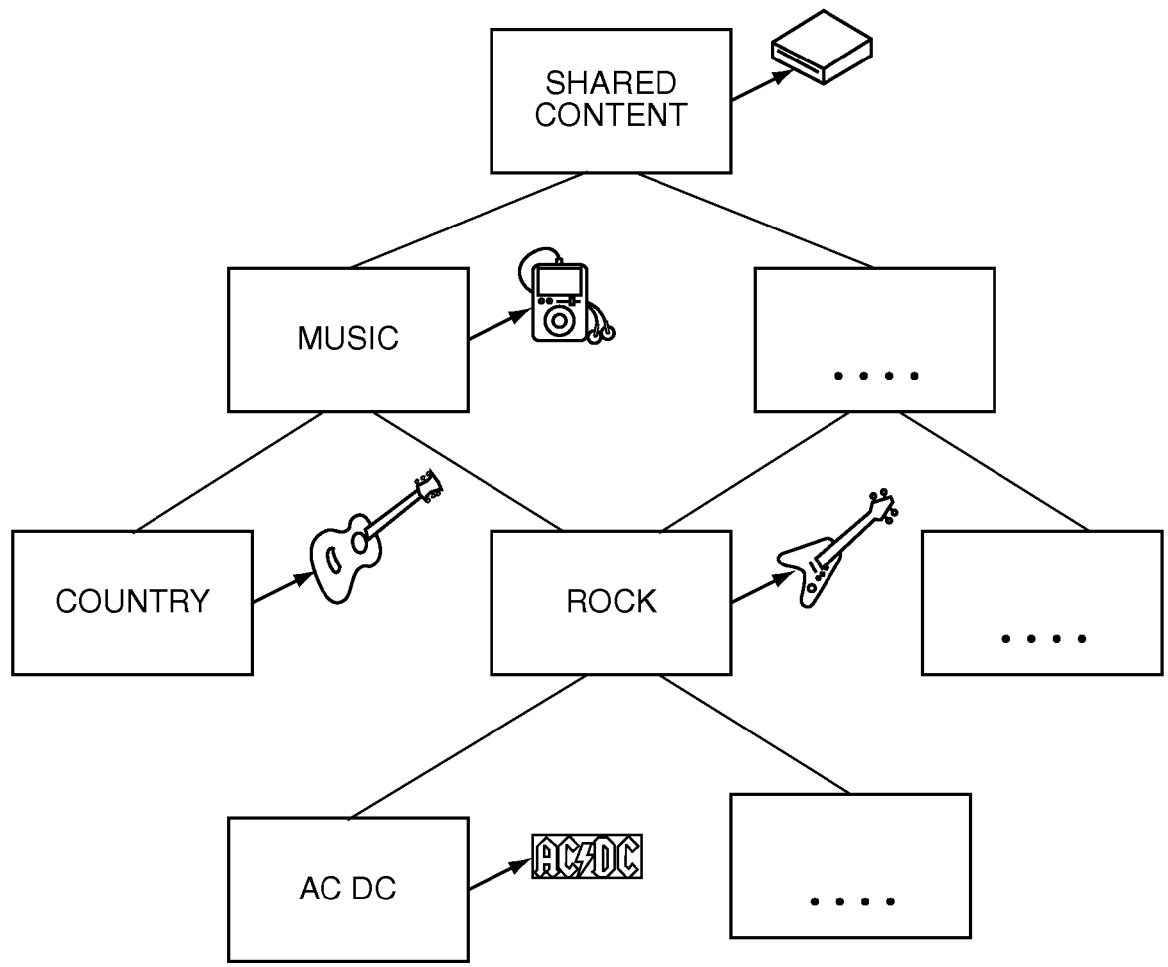
FIG. 6 illustrates an exemplary ontology defining content representations according to one embodiment of the present invention.

Before proceeding to step 208, an exemplary ontology is illustrated in FIG. 6. Note that the exemplary ontology of FIG. 6 is for illustrative purposes and not intended to limit the scope of the present invention. In this example, the ontology includes a "shared content" node, a "music" node, a "country" node, a "rock" node, an "AC/DC" node, and the like. Each of the nodes has one or more associated content representations that are indicative of the corresponding node in the ontology. Using this ontology, the content metadata for the user 36-1 may be processed to determine which of the content representations are applicable to the content made available by the user 36-1. For example, if the content metadata for the user 36-1 includes metadata for shared music from the Country genre, the rules for the nodes in the ontology may be defined such that the content representations for the "shared content" node, the "music" node, and the "country" node are all applicable to the content made available by the user 36-1. If the content metadata for the user 36-1 also includes metadata for shared music from the Rock genre, the rules for the nodes in the ontology may be defined such that the content representation for the "rock" node is also applicable to the content made available by the user 36-1. In order to determine which ontological nodes are applicable, a scoring scheme may be used such as that disclosed in U.S. patent application Ser. No. 11/359,632, entitled "Methods, Systems, and Products for Characterizing Target Systems," filed Feb. 22, 2006 and U.S. patent application Ser. No. 11/414,021, entitled "Methods, Systems, and Products for Classifying Content Segments," filed Apr. 28, 2006, both of which are hereby incorporated herein by reference in their entireties.

Note that the process of determining which content representations are applicable to the content made available by the user 36-1 may occur in response to the user event or at some previous point in time. For example, the CR engine 54 may determine which content representations are applicable when the content metadata for the content made available by the user 36-1 is first added to the content metadata database 40 and thereafter updated as desired.

Returning to FIG. 5, once the CR engine 54 has identified the applicable content representations, the CR engine 54 may optionally filter the applicable content representations based on, for example, the user preferences of the viewing user 32-1 (step 208). For example, if the preferred genre of the viewing user 32-1 is Country and the applicable content representations include a country content representation and a rock content representation, the CR engine 54 may filter the applicable content representations such that only the country content representation is presented in association with the avatar of the hosting user 36-1 in the view of the viewing user 32-1.

The CR engine 54 then provides the applicable content representations or information identifying the applicable content representations to the layers engine 56 (step 210). If the filtering process of step 208 is performed, the filtered content representations or information identifying the filtered content representations are provided to the layers engine 56.

In response, the layers engine 56 generates CR layers for the applicable content representations or filtered content representations (step 212). In one embodiment, the layers engine 56 generates the CR layers by determining a number of CR layers to be formed between the avatars of the viewing and hosting users 32-1 and 36-1, assigning a distance threshold to each of the CR layers, and selecting one or more of the applicable content representations for each of the CR layers. The layers engine 56 determines the number and granularity of the CR layers based on, for example, user preferences of the hosting user 36-1, an environment in which the avatars or users 32-1 and 36-1 are located, user preferences of the viewing user 32-1, volume of content representations in the view of the viewing user 32-1, or any combination thereof.

More specifically, the layers engine 56 may select the number of CR layers and granularity of the CR layers based on user preferences of the hosting user 36-1. The user preferences of the hosting user 36-1 may include, in addition to those discussed above, information describing a group of users that are to see a maximum number of CR layers with maximum granularity, information describing a group of users that are to see an intermediate number of CR layers with intermediate granularity, information describing a group of users that are to see a minimal number of CR layers with minimal granularity, or the like or any combination thereof. The information describing each of the groups of users may be identifiers of the users in the virtual environment; demographic information defining the group of users; preferences such as preferred genres, time periods, or artists defining the group of users; or other qualities defining the group of users.

The layers engine 56 may additionally or alternatively consider the environment in which the avatars or users 32-1 and 36-1 are located in order to select the number of CR layers and the granularity of the CR layers. The environment of the avatars may be identified by the logic server 50. The environment of the users 32-1 and 36-1 may be identified based on, for example, information indicative of location from Global Positioning System (GPS) receivers, base stations to towers in a cellular network, network access points, or the like associated with the client devices 30-1 and 34-1 as correlated to a map or directory, user input from the users 32-1 and 36-1, or the like. As such, if, for example, the avatars are located within a Jazz club in the virtual environment and the hosting user 36-1 has content from the Jazz genre, the layers engine 56 may form the CR layers such that a maximum number of CR layers or all possible CR layers related to the Jazz genre are provided for the viewing user 32-1. In a similar fashion, if the users 32-1 and 36-1 are physically located in a Jazz club and the hosting user 36-1 has content from the Jazz genre, the layers engine 56 may form the CR layers such that a maximum number of CR layers or all possible CR layers related to the Jazz genre are provided for the viewing user 32-1.

The layers engine 56 may additionally or alternatively consider the user preferences of the viewing user 32-1 when selecting the number of CR layers and granularity of the CR layers. By comparing the user preferences such as the preferred genres, preferred time periods, preferred artists and/or the content metadata for the content made accessible by the viewing user 32-1 to the content metadata or applicable content representations for the hosting user 36-1, the layers engine 56 may determine the number of CR layers and granularity of the CR layers to provide for the viewing user 32-1. If the user preferences and/or content metadata of the viewing user 32-1 closely match the content metadata or applicable content representations for the hosting user 36-1, the layers engine 56 may provide a relatively large number of CR layers and high granularity. For example, the layers engine 56 may provide the maximum number of CR layers or all possible CR layers for the viewing user 32-1.

The layers engine 56 may additionally or alternatively consider the volume of content representations to be presented within the view of the viewing user 32-1. If the volume of content representations in the view of the viewing user 32-1 is large, the layers engine 56 may decide to reduce the number of CR layers in order to reduce visual clutter.

In this example, after the layers engine 56 has generated the CR layers, the layers engine 56 obtains the distance between the avatar of the viewing user 32-1 and the avatar of the hosting user 36-1 in the virtual environment (step 214). Note that the layers engine 56 may alternatively generate the CR layers after obtaining the distance between the two avatars. Based on the distance and the distance thresholds for the CR layers, the layers engine 56 selects a CR layer (step 216). The layers engine 56 then provides the one or more content representations for the selected CR layer or information identifying the one or more of the content representations for the selected CR layer to the environment generation engine 52 in order to effect presentation of the one or more content representations for the selected CR layer in association with the avatar of the hosting user 36-1 in the view of the virtual environment provided to the viewing user 32-1 (step 218). The environment generation engine 52 then generates the view of the virtual environment for the viewing user 32-1 including the avatar of the hosting user 36-1 and the one or more content representations for the selected CR layer and outputs the view to the client device 30-1 of the viewing user 32-1 (step 220). The client view may include objects such as graphics and the like needed to form the client view or metadata or other information describing the objects and the locations of the objects to be presented in the client view.

In this example, the logic server 50 subsequently receives an event modifying the distance between the avatars of the viewing and hosting users 32-1 and 36-1 in the virtual environment (step 222). In response, the logic server 50 determines a distance, or updated distance, between the two avatars and provides the distance to the layers engine 56 (step 224). Optionally, the layers engine 56 may check for updates that would affect the number of CR layers or granularity of the CR layers between the two avatars and regenerates the CR layers if desired (step 226). For example, if the user preferences of the hosting user 36-1, the environment of the avatars or the users 32-1 and 36-1, the user preferences of the viewing user 32-1, the volume of content representations in the view of the viewing user 32-1, or the content metadata for the users 32-1 and 36-1 has changed, the layers engine 56 may regenerate the CR layers to account for the changes. Thus, the CR layers between the two avatars may be dynamically updated. Alternatively, the layers engine 56 may not check for updates or regenerate the CR layers. As another alternative, the layers engine 56 may automatically regenerate the CR layers without checking for updates.

The layers engine 56 then selects a CR layer based on the distance between the avatars of the users 32-1 and 36-1 in the virtual environment (step 228) and provides the one or more content representations for the selected CR layer or information identifying the one or more content representations for the selected CR layer to the environment generation engine 52 (230). The environment generation engine 52 then generates the view of the virtual environment for the viewing user 32-1 including the avatar of the hosting user 36-1 and the one or more content representations for the selected CR layer and outputs the view to the client device 30-1 of the viewing user 32-1 (step 232). This process continues such that the content representation(s) presented in association with the avatar of the hosting user 36-1 changes as the distance between the two avatars changes.

Figure 7:
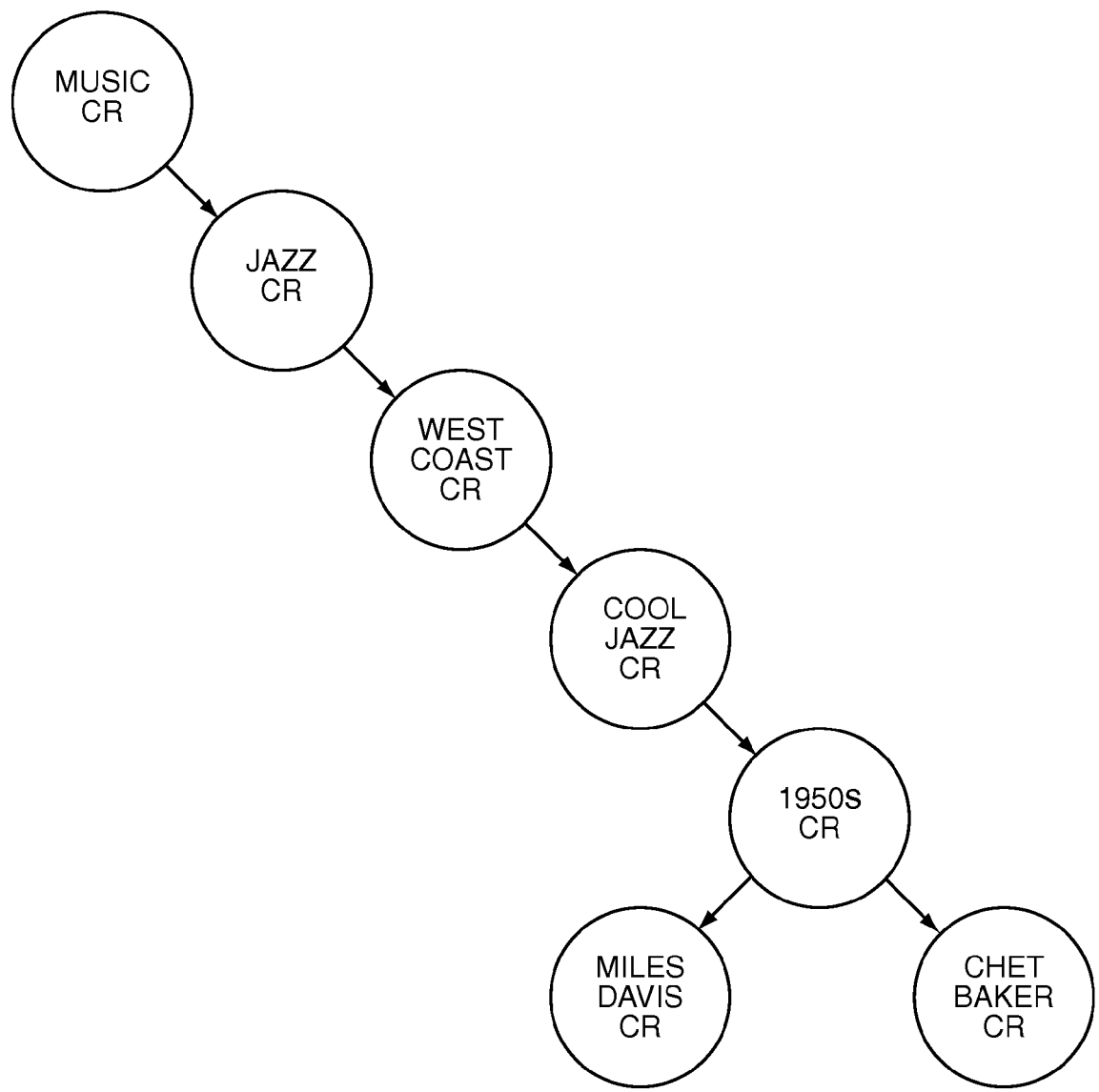
FIG. 7 illustrates a number of nodes of an ontology corresponding to applicable content representations descriptive of content made accessible by a hosting user according to an exemplary embodiment of the present invention.
Figure 8A:
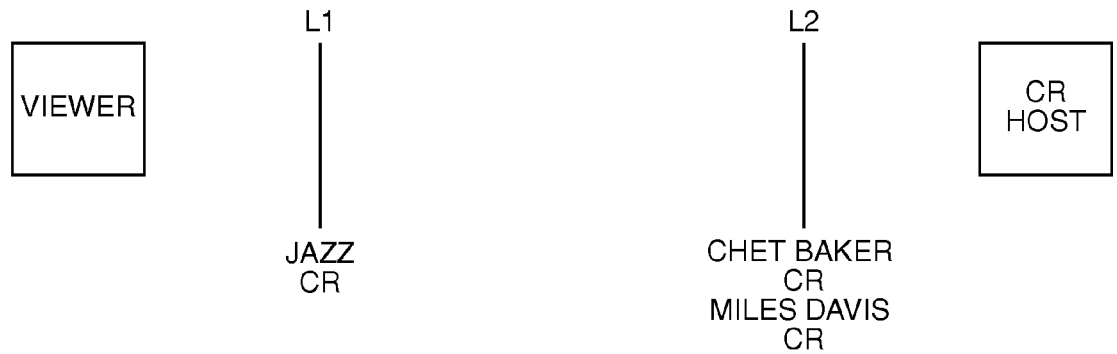
FIGS. 8A-8C illustrate the layering technique of the present invention with respect to the applicable content representations of FIG. 7 according to an exemplary embodiment of the present invention.
Figure 8B:
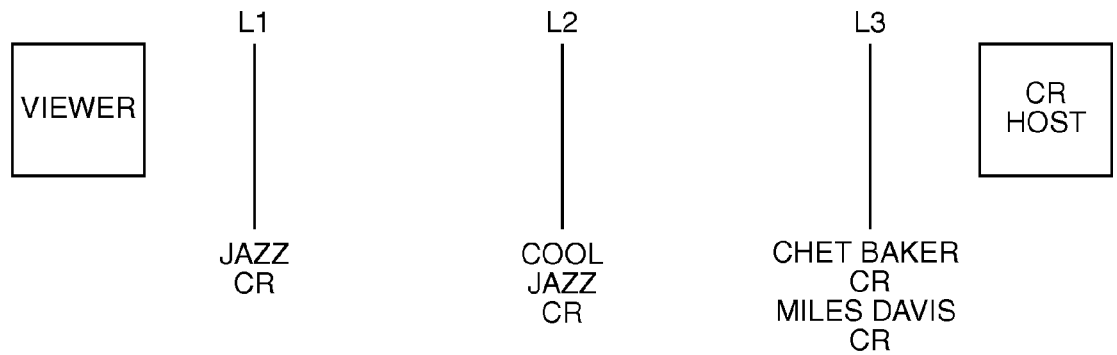
Figure 8C:
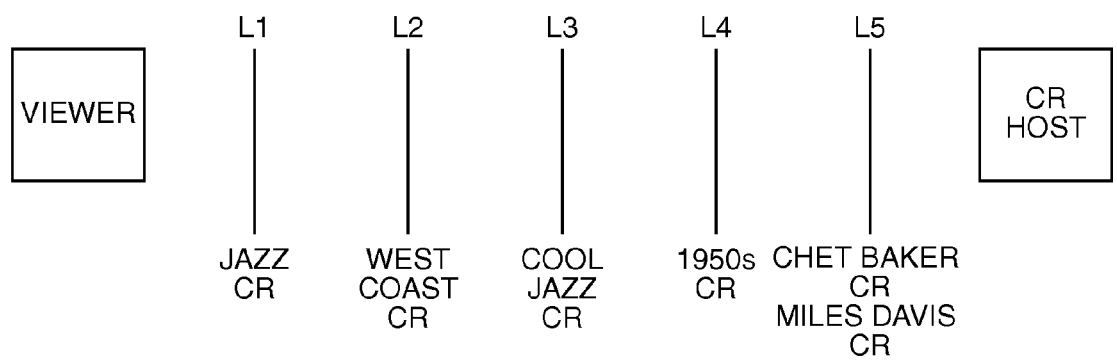

FIGS. 7 and 8A-8C illustrate the process of generating the CR layers between the avatars of the viewing and hosting users 32-1 and 36-1. FIG. 7 illustrates exemplary applicable content representations for the hosting user 36-1. Note that the applicable content representations may be all of the applicable content representations or the filtered version of the applicable content representations. FIGS. 8A-8C illustrate three different scenarios. FIG. 8A illustrates the scenario where the layers engine 56 determines that a small number of CR layers are to be provided for the viewing user 32-1. For example, the layers engine 56 may determine that the viewing user 32-1 has little or no interest in music from the Jazz genre. As such, in this example, two CR layers are formed where the first CR layer (L1) is associated with a Jazz content representation and the second CR layer (L2) is associated with a Chet Baker content representation and a Miles Davis content representation. As such, when the distance between the two avatars is greater than the distance threshold for the first CR layer (L1), the layers engine 56 may effect presentation of the music content representation in association with the avatar of the hosting user 36-1 in the view of the virtual environment provided to the viewing user 32-1. When the distance between the two avatars is less than the distance threshold for the first CR layer (L1) and greater than the distance threshold for the second CR layer (L2), the layers engine 56 effects presentation of the Jazz content representation in association with the avatar of the hosting user 36-1 in the view of the virtual environment provided to the viewing user 32-1. Lastly, when the distance between the two avatars is less than the distance threshold for the second CR layer (L2), the layers engine 56 effects presentation of the Chet Baker and Miles Davis content representations.

In contrast, if, for example, the layers engine 56 determines that the viewing user 32-1 has some interest in music from the Jazz genre, the layers engine 56 may form an intermediate number of CR layers as illustrated in FIG. 8B. In this example, the layers engine 56 forms three CR layers where the first CR layer (L1) is associated with the Jazz content representation, the second CR layer (L2) is associated with the Cool Jazz content representation, and the third CR layer (L3) is associated with the Chet Baker and Miles Davis content representations. Again, the music content representation may be presented when the distance between the two avatars is greater than the distance threshold for the first CR layer (L1).

Still further, if, for example, the layers engine 56 determines that the viewing user 32-1 is highly interested in music from the Jazz genre, the layers engine 56 may provide all CR layers related to the Jazz genre as illustrated in FIG. 8C. In this example, five CR layers are formed where the first CR layer (L1) is associated with the Jazz content representation, the second CR layer (L2) is associated with the West Coast content representation, the third CR layer (L3) is associated with the Cool Jazz content representation, the fourth CR layer (L4) is associated with the 1950s content representation, and the fifth CR layer (L5) is associated with the Chet Baker and Miles Davis content representations. Again, the music content representation may be presented when the distance between the two avatars is greater than the distance threshold for the first CR layer (L1).

Figure 9:
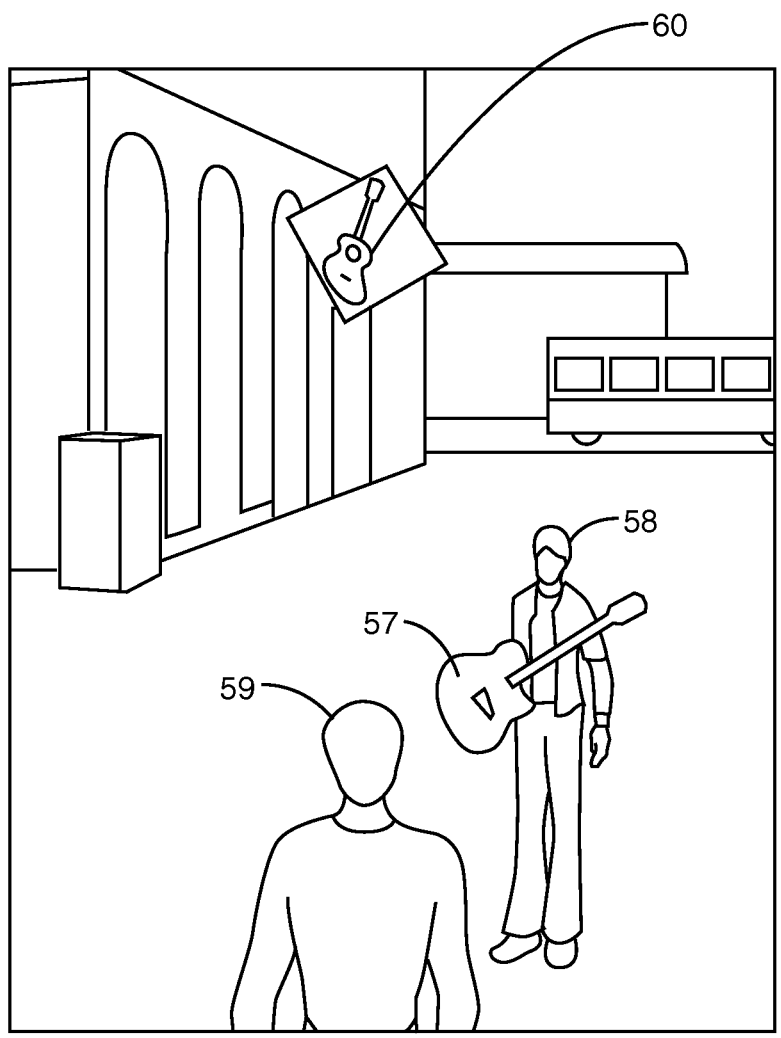
FIG. 9 illustrates a first exemplary client view of a user wherein content representations are associated with avatars representing hosting users in a virtual environment according to one embodiment of the present invention.

FIG. 9 is an exemplary client view of a virtual environment provided to, for example, the user 32-1 according to the present invention. As illustrated, a content representation 57 is presented in association with an avatar 58 of a hosting user, which may be the user 36-1. The content representation 57 is descriptive of the content made accessible by the user 36-1. In this example, the content representation 57 enables the user 32-1, which is represented by avatar 59, to easily determine that music from the Rock genre is available from the user 36-1 represented by the avatar 58. Further, as the distance between the two avatars 58 and 59 changes, the layers engine 56 operates to change the content representation 57 according to the layering technique described above. In addition, content representations may be presented in association with other virtual objects in the virtual environment such as storefronts, virtual stereos of avatars such as the avatars 58 and 59, and the like. In this example, a content representation 60 is presented in association with a storefront. From the content representation 60, the user 32-1 can easily determine that music from the Country genre is available from, for example, a user represented by an avatar within the store, an owner or operator of the store, some virtual object within the store, an e-commerce service represented by the storefront, or the like. Note that the layers engine 56 may also operate to change the content representation 60 according to the layering technique described above.

Figure 10:
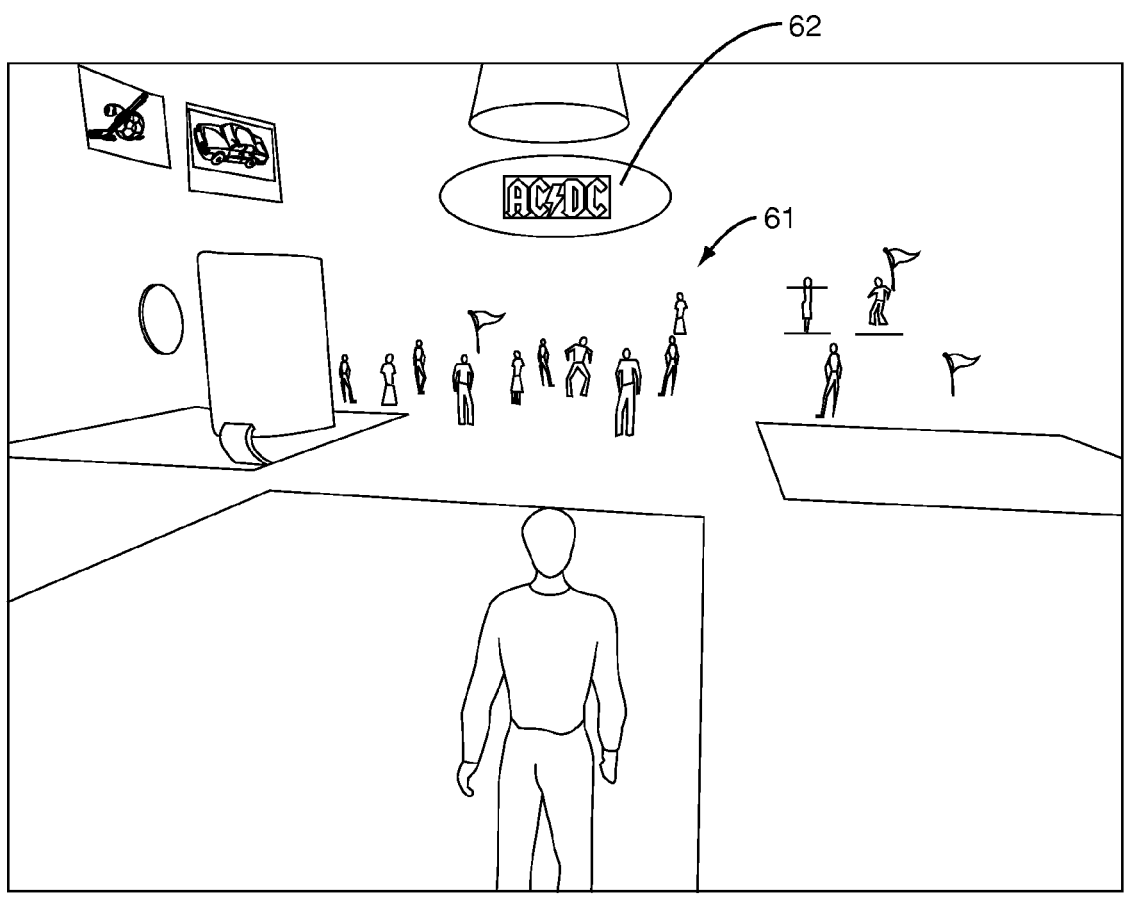
FIG. 10 illustrates a second exemplary client view of a user wherein a content representation is associated with a group of avatars in a virtual environment according to one embodiment of the present invention.

FIG. 10 is another exemplary client view of the user 32-1 that illustrates another function that may be provided by the CR engine 54 and the layers engine 56. In this illustration, a large group of avatars 61 may be within the view of the user 32-1. In this situation, it may not be desirable to display a separate content representation for each of the avatars. As such, the CR engine 54 may process the content metadata for all of the users represented by the avatars in the group 61 to determine the content representations that are applicable to the group 61. The layers engine 56 may generate CR layers for the group 61 and effect presentation of one or more of the applicable content representations in association with the group 61 based on a distance between the avatar of the user 32-1 and the group 61 in the virtual environment. Note that the CR engine 54 may additionally filter the applicable content representations based on the user preferences of the user 32-1. In this example, an AC/DC content representation 62 is presented above the group, thereby indicating that music by AC/DC is available from the group 61. However, as the distance between the avatar of the user 32-1 and the group 61 changes, the layers engine 56 operates to change the content representation. For example, if the user 32-1 moves his avatar away from the group 61, the layers engine 56 may change the content representation 62 to a content representation for the Rock genre.

Figure 11B:
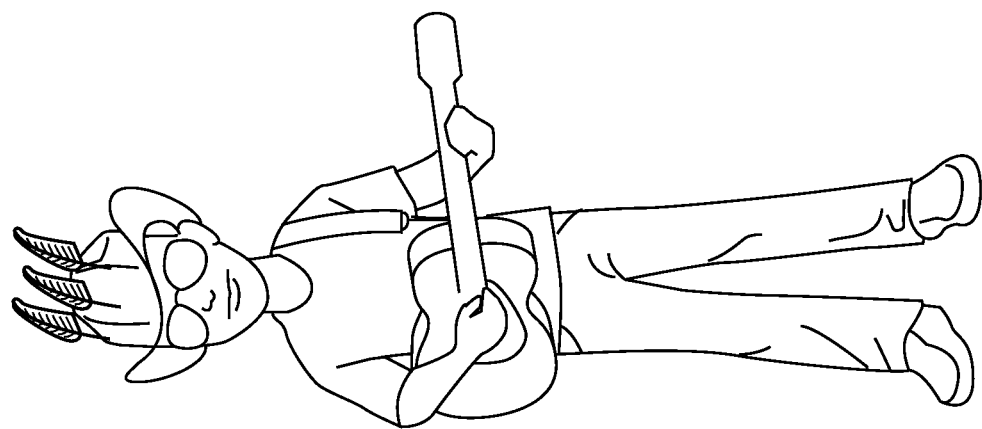
FIGS. 11A and 11B illustrate an exemplary avatar wherein filtering is applied to the content representations based on the user preferences of two different users according to one embodiment of the present invention.
Figure 11A:
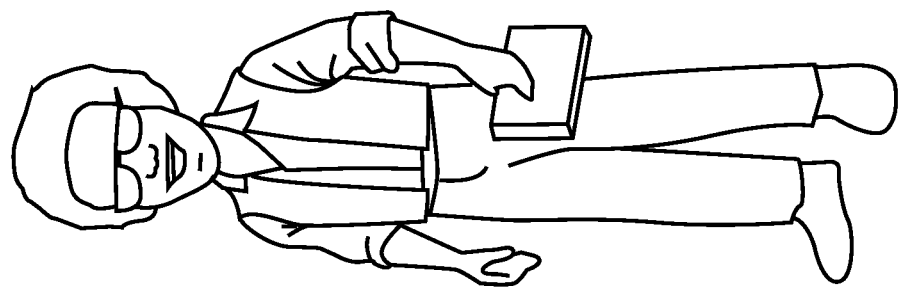

FIGS. 11A and 11B illustrate an exemplary avatar where the applicable content representations have been filtered by the CR engine 54 according to user preferences of two different viewers according to one embodiment of the present invention. As discussed above, once the CR engine 54 has identified the content representations that are applicable to the content of the hosting user, the CR engine 54 may filter the applicable content representations based on the user preferences of the viewing user. By filtering the applicable content representations, the CR engine 54 selects one or more of the applicable content representations related to content of interest to the viewing user. As such, the content representations presented in association with the avatar of a hosting user may vary depending on the user preferences of the viewing user. For example, FIG. 11A illustrates an exemplary avatar of a hosting user after filtering of the associated content representations based on the user preferences of a first viewing user. FIG. 11B illustrates the same avatar after filtering of the associated content representations based on the user preferences of a second viewing user. Thus, the content representations presented in association with the same avatar may be different in the view of the virtual environment provided to the first viewing user and the view of the virtual environment provided to the second viewing user.

Figure 12:
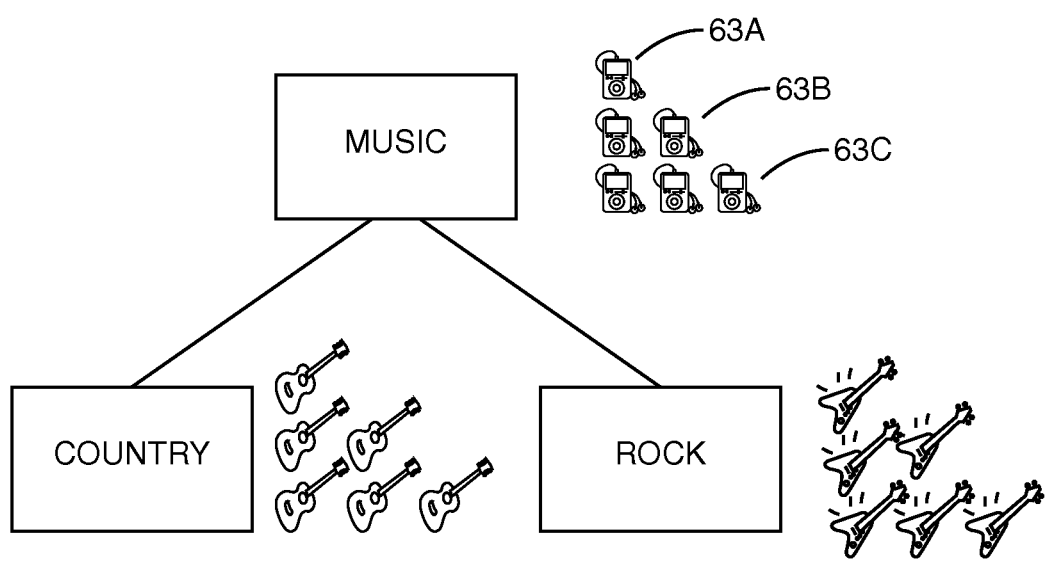
FIG. 12 illustrates an additional feature wherein the content representations are both descriptive of the content as well as the quality of the content according to one embodiment of the present invention.

FIG. 12 illustrates content representations that may be used to indicate quality in addition to another content descriptor such as, for example, content type, genre, or the like according to one embodiment of the present invention. In this example, a content representation 63A including a single music player may be used to indicate low quality music content, a content representation 63B including two music players may be used to indicate medium quality music content, and a content representation 63C including three music players may be used to indicate high quality music content. In a similar fashion, content representations defining quality as well as genre may be defined for the "country" and "rock" nodes. As such, the CR engine 54 may also consider content quality when identifying applicable content representations for the content made accessible by a user. In a similar fashion, content representations may be defined to indicate quantity of content, availability or accessibility, DRM or copyright restrictions, or the like.

Note that, with respect to the layering scheme of the present invention, content representations indicative of quality may be presented at all layers if possible or only a one or more of the layers. For example, either system defined or user defined configurations may be provided such that content representations indicative of quality are only presented at one or more low layers, only to one or more desired users, or the like.

FIG. 13 is a block diagram of an exemplary embodiment of the VE server 28-1 according to one embodiment of the present invention. Note that this discussion is equally applicable to the other VE servers 28-2 through 28-N$_1$. In general, the VE server 28-1 includes a control system 64 having associated memory 66. In this example, the VE engine 38, which includes the logic server 50, the environment generation engine 52, the CR engine 54, and the layers engine 56, is implemented in software and stored in the memory 66. However, the present invention is not limited thereto. The VE server 28-1 also includes one or more digital storage devices 68 such as, for example, one or more hard disc drives, one or more optical storage devices, or the like. The digital storage devices 68 may operate to store the databases 40-48 (FIG. 4). The VE server 28-1 also includes a communication interface 70 communicatively coupling the VE server 28-1 to the central VE server and database 26 and the client devices 30-1 through 30-N$_2$ via one or more networks. The VE server 28-1 may also include a user interface 72, which may include components such as, for example, a display, one or more user input devices, and the like.

FIG. 14 is a block diagram of an exemplary embodiment of the client device 30-1 according to one embodiment of the present invention. Note that this discussion is equally applicable to the other client devices 30-2 through 30-N$_2$ and 34-1 through 34-N$_3$. In general, the client device 30-1 includes a control system 74 having associated memory 76. The memory 76 may store software instructing the client device 30-1 to operate according to the present invention. The client device 30-1 also includes one or more digital storage devices 78 such as, for example, one or more hard disc drives, one or more optical storage devices, or the like. The digital storage devices 78 may operate to store the content shared by or otherwise made accessible by the user 32-1 of the client device 30-1. The client device 30-1 also includes a communication interface 80 communicatively coupling the client device 30-1 to the VE server 28-1 via a network. The client device 30-1 may also include a user interface 82, which may include components such as, for example, a display, one or more user input devices, and the like.

Figure 15:
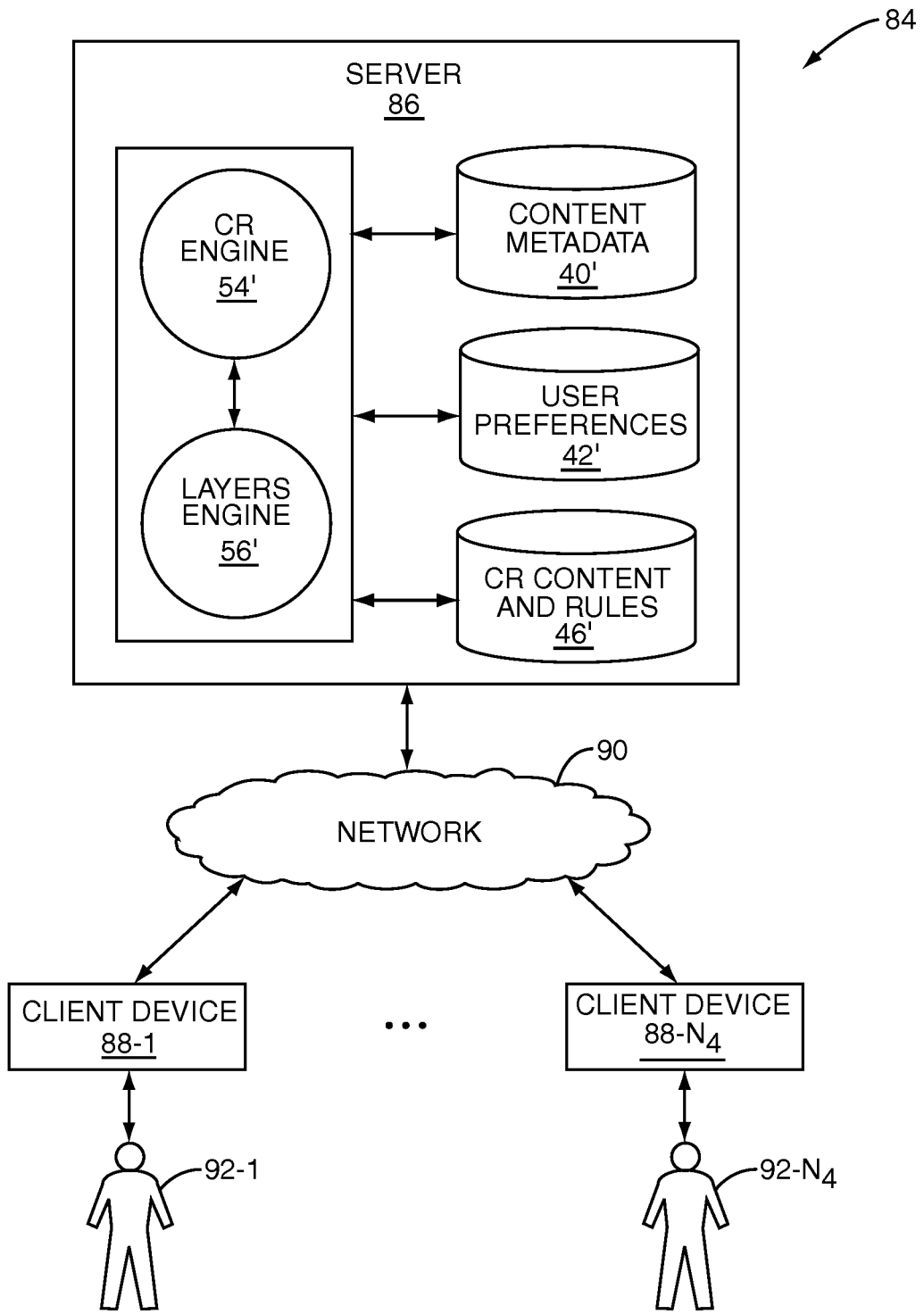
FIG. 15 is a system providing content representations according to another embodiment the present invention.

While the discussion above focuses on the CR engine 54 and layers engine 56 with respect to a virtual environment, the present invention is not limited thereto. The CR engine 54 and layers engine 56 should be viewed as an additive technology that may be implemented in any type of system where it is desirable to have content representations enabling users to easily determine whether content of interest is shared or otherwise made accessible by other users in the system. More specifically, FIG. 15 illustrates a system 84 providing content representations according to one embodiment of the present invention. The system 84 may be, for example, a system providing custom webpages for users such those provided by MYSPACE™ web service, a Peer-to-Peer (P2P) content sharing network, a mobile network such as a cellular network or a wireless ad hoc network formed using a local wireless standard such as one of the suite of IEEE 802.11 standards or the BLUETOOTH™ standard, or the like.

In general, the system 84 includes a server 86 and a number of client devices 88-1 through 88-N$_4$ connected by a network 90. The network 90 may be any type of Wide Area Network (WAN), Local Area Network (LAN), or any combination thereof and may include wired components, wireless components, or both wired and wireless components. For example, the network 90 may be the Internet. The client devices 88-1 through 88-N$_4$ have associated users 92-1 through 92-N$_4$.

The server 86 includes a CR engine 54', a layers engine 56', a content metadata database 40', a user preferences database 42', and a CR content and rules database 46'. The CR engine 54', the layers engine 56', the content metadata database 40', the user preferences database 42', and the CR content and rules database 46' are substantially the same as the CR engine 54, the layers engine 56, the content metadata database 40, the user preferences database 42, and the CR content and rules database 46 discussed above. However, the specific details of each may vary depending on the embodiment of the system 84.

As a first example, the system 84 may be a system providing custom webpages for the users 92-1 through 92-N4, where the webpages are hosted by the server 86. For example, the custom webpages may be similar to those provided by MySpace. The custom webpages operate as content representation hosts. In operation, when the user 92-1 interacts with the client device 88-1 to request the webpage of the user 92-N4 from the server 86, the CR engine 54' operates to identify applicable content representations descriptive of content shared by or otherwise made available by the user 92-N4. The CR engine 54' may optionally filter the applicable content representations based on the user preferences of the user 92-1. As discussed above, the layers engine 56' generates CR layers where each CR layer is associated with one or more of the applicable content representations and has an associated distance threshold. However, in this embodiment, the distance threshold may be a physical distance between the users 92-1 and 92-N4, a distance between the users 92-1 and 92-N4 in a social network, or the like. The distance between the users 92-1 and 92-N4 in a social network may be a number of hops between the users 92-1 and 92-N4. For example, if the users 92-1 and 92-N4 are indirectly related in the social network via a common friend, the distance between the users 92-1 and 92-N4 in the social network may be defined as 2. The physical distance may be determined based on, for example, location information from GPS receivers associated with the client devices 88-1 and 88-N4, location information inferred from Internet Protocol (IP) addresses of client devices 88-1 and 88-N4, or the like.

Based on the distance between the users 92-1 and 92-N$_4$, the layers engine 56' selects a corresponding CR layer and effects presentation to the user 92-1 of one or more content representations associated with the selected CR layer in association with the custom webpage of the user 92-N$_4$. For example, in this embodiment, a content representation may be a graphic displayed within the webpage or a layout of the webpage including, for example, a background of the webpage, graphics within the webpage, an audio clip played while viewing the webpage, or the like or any combination thereof. Again, as the distance between the users 92-1 and 92-N$_4$ decreases, the layers engine 56' operates to effect presentation of content representations having increased specificity.

As a second example, the system 84 may be a P2P content sharing network. In this example, the system 84 is more specifically a hybrid P2P content sharing network wherein server 86 also provides a proxy function acting as an intermediary between the client devices 88-1 through 88-N$_4$ or provides a connection set-up function for establishing direct P2P connections between the client devices 88-1 through 88-N$_4$. It should be noted that, in an alternative embodiment, the client devices 88-1 through 88-N$_4$ may communicate in a true P2P fashion, and the CR engine 54' and layers engine 56' may be hosted by one of the client devices 88-1 through 88-N$_4$ or distributed among two or more of the client devices 88-1 through 88-N$_4$.

The CR engine 54' and layers engine 56' may operate to effect presentation of content representations to the user 92-1 as, for example, part of a query response where identifiers of the users or peers in the P2P content sharing network operate as the content representation hosts. More specifically, in response to a query from the client device 88-1, the CR engine 54' may identify the applicable content representations for the user 92-N$_4$ and optionally filter the applicable content representations. The layers engine 56' generates CR layers as described above, selects a CR layer based on a distance between the users 92-1 and 92-N$_4$, and effects presentation of one or more of the applicable content representations associated with the selected CR layer in association with an identifier of the user 92-N$_4$ or the client device 88-N$_4$ in the query response provided to the client device 88-1. In this embodiment, the distance between the users 92-1 and 92-N$_4$ may be, for example, a physical distance between the users 92-1 and 92-N$_4$, a number of hops between the client devices 88-1 and 88-N$_4$ in the network 90 or the P2P overlay network, a distance between the users 92-1 and 92-N$_4$ in a social network, or the like.

In addition or alternatively, the user 92-1 may maintain a "buddy list" identifying other users in the system 84 such as the user 92-N$_4$. As such, the CR engine 54' and the layers engine 56' may effect presentation of one or more content representations in association with an identifier of the user 92-N$_4$ in the buddy list of the user 92-1.

As a third example, the system 84 may be a mobile network such as a cellular network. The user 92-1 may maintain a "buddy list" identifying other users in the system 84 such as the user 92-N$_4$. As such, using the user 92-N$_4$ as an example, the CR engine 54' and the layers engine 56' may effect presentation of one or more content representations in association with an identifier of the user 92-N$_4$ in the buddy list of the user 92-1, where the identifier of the user 92-N$_4$ operates as a content representation host. Again, the layers engine 56' may control which applicable content representations are presented based on a distance between the users 92-1 and 92-N$_4$. In this embodiment, the distance between the users 92-1 and 92-N$_4$ may be a physical distance between the users 92-1 and 92-N$_4$ or the like.

The examples above are intended to illustrate that the present invention is not limited to a virtual environment system as described above with respect to FIGS. 1-14 and should not be considered to limit the scope of the present invention. One of ordinary skill in the art will appreciate that the CR engine 54, 54' and the layers engine 56, 56' of the present invention are an additive technology that may be incorporated in any type of system wherein content representations are desirable.

Figure 16:
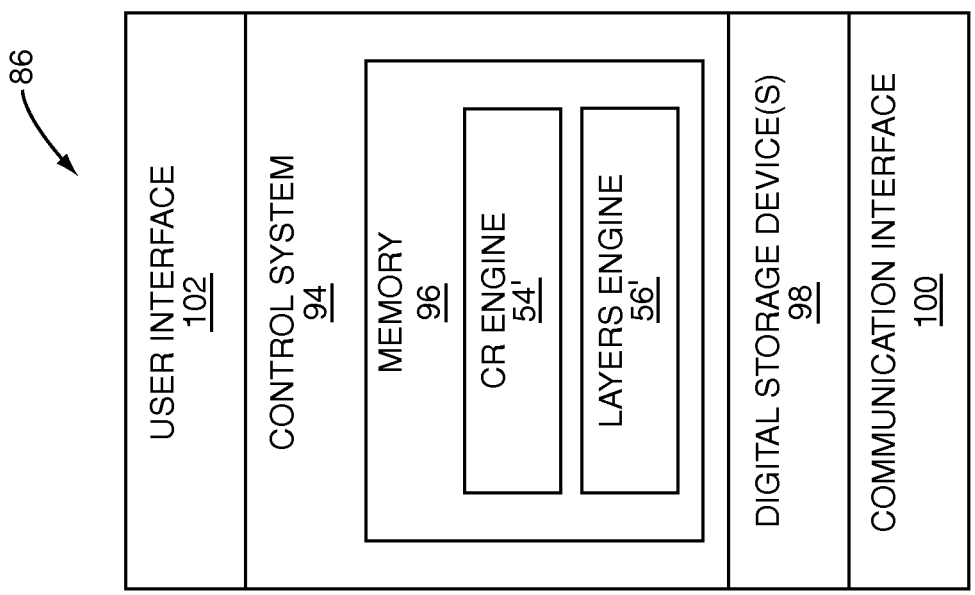
FIG. 16 is a block diagram of an exemplary embodiment of the server of FIG. 15 according to one embodiment of the present invention.

FIG. 16 is a block diagram of an exemplary embodiment of the server 86 of FIG. 15 according to one embodiment of the present invention. In general, the server 86 includes a control system 94 having associated memory 96. In this example, the CR engine 54' and the layers engine 56' are implemented in software and stored in the memory 96. However, the present invention is not limited thereto. The server 86 also includes one or more digital storage devices 98 such as, for example, one or more hard disc drives, one or more optical storage devices, or the like. The digital storage devices 98 may operate to store the content metadata database 40', the user preferences database 42' and the CR content and rules database 46' (FIG. 15). The server 86 also includes a communication interface 100 communicatively coupling the server 86 to the network 90 (FIG. 15). The server 86 may also include a user interface 102, which may include components such as, for example, a display, one or more user input devices, and the like.

Figure 17:
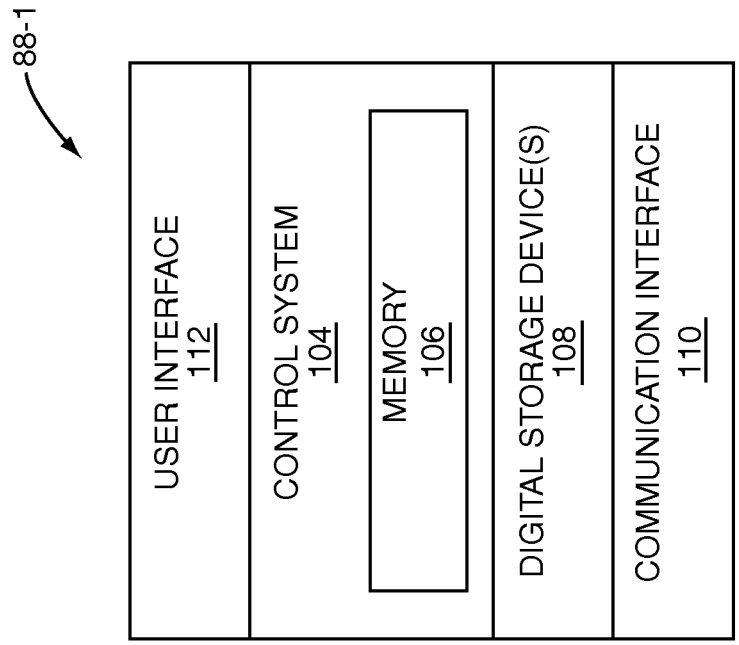
FIG. 17 is a block diagram of an exemplary embodiment of one of the client devices of FIG. 15 according to one embodiment of the present invention.

FIG. 17 is a block diagram of an exemplary embodiment of the client device 88-1 according to one embodiment of the present invention. Note that this discussion is equally applicable to the other client devices 88-2 through 88-N$_4$. In general, the client device 88-1 includes a control system 104 having associated memory 106. The memory 106 may store software instructing the client device 88-1 to operate according to the present invention. The client device 88-1 also includes one or more digital storage devices 108 such as, for example, one or more hard disc drives, one or more optical storage devices, or the like. The digital storage devices 108 may operate to store the content shared by or otherwise made accessible by the user 92-1 of the client device 88-1. The client device 88-1 also includes a communication interface 110 communicatively coupling the client device 88-1 to the server 86 via the network 90 (FIG. 15). The client device 88-1 may also include a user interface 112, which may include components such as, for example, a display, one or more user input devices, and the like.

For related information, the interested reader is directed to commonly owned and assigned U.S. patent application Ser. No. 11/678,781, entitled SYSTEM AND METHOD FOR REPRESENTING CONTENT, filed on Feb. 26, 2007 and U.S. patent application Ser. No. 11/678,813, entitled INTERACTIVE CONTENT REPRESENTATIONS ENABLING CONTENT SHARING, filed on Feb. 26, 2007, which are both hereby incorporated herein by reference in their entireties.

Those skilled in the art will recognize improvements and modifications to the preferred embodiments of the present invention. All such improvements and modifications are considered within the scope of the concepts disclosed herein and the claims that follow.

What is claimed is:

1. A method comprising:
obtaining metadata describing content made accessible by a hosting user;
identifying applicable content representations that are descriptive of the content from a plurality of defined content representations based on the metadata;
generating a plurality of content representation (CR) layers between the hosting user and a viewing user, each of the plurality of CR layers associated with at least one of the applicable content representations and having an associated distance threshold where each of the plurality of CR layers has a different content representation based on the associated distance threshold such that the at least one of the applicable content representations is based on the associated distance threshold;
obtaining distance indicia providing one of a group consisting of: a distance between an avatar representing the hosting user and an avatar representing the viewing user and a distance between the hosting user and the viewing user;
selecting a CR layer from the plurality of CR layers based on the distance indicia and the distance threshold of at least one of the plurality of CR layers; and
effecting presentation to the viewing user of the at least one of the applicable content representations associated with the CR layer in association with the content representation host representing the hosting user, wherein the at least one of the applicable content representations presented to the viewing user is presented based on the distance between the avatar representing the hosting user and the avatar representing the viewing user or the distance between the hosting user and the viewing user.

2. The method of claim 1 wherein, effecting presentation of the at least one of the applicable content representations comprises effecting presentation of the at least one of the applicable content representations associated with the CR layer in association with the avatar representing the hosting user within a view of the virtual environment presented to the viewing user.

3. The method of claim 2 wherein the at least one of the applicable content representations is a visual element presented alongside the avatar representing the hosting user within the view of the virtual environment presented to the viewing user.

4. The method of claim 2 wherein the at least one of the applicable content representations is a modification to at least one of a group consisting of: clothes, hairstyle, and accessories of the avatar representing the hosting user within the view of the virtual environment presented to the viewing user.

5. The method of claim 1 wherein the hosting user and the viewing user are users of a peer-to-peer (P2P) content sharing network, the distance indicia includes distance between the hosting user and the viewing user, and the avatar representing the hosting user is an identifier of the hosting user in the P2P content sharing network.

6. The method of claim 5 wherein the distance between the hosting user and the viewing user is a physical distance between the hosting user and the viewing user.

7. The method of claim 5 wherein the distance between the hosting user and the viewing user is a number of hops between a client device of the hosting user and a client device of the viewing user in the P2P content sharing network.

8. The method of claim 1 wherein the hosting user and the viewing user are users of a mobile network, the distance indicia includes a distance between the hosting user and the viewing user, and the content representation host representing the hosting user is an identifier of the hosting user in the mobile network.

9. The method of claim 8 wherein the distance between the hosting user and the viewing user is a physical distance between the hosting user and the viewing user.

10. The method of claim 1 wherein generating the plurality of CR layers between the hosting user and the viewing user comprises selecting a number of CR layers to form based on at least one of a group consisting of: preferences of the hosting user, information descriptive of an associated environment, preferences of the viewing user, and volume of content representations presented to the viewing user.

11. The method of claim 1 further comprising:
receiving new distance indicia;
selecting a new CR layer from the plurality of CR layers by comparing the new distance indicia to the distance threshold of at least one of the plurality of CR layers; and
effecting presentation to the viewing user of the at least one of the applicable content representations associated with the new CR layer in association with the content representation host representing the hosting user.

12. The method of claim 1 wherein the plurality of defined content representations corresponds to a plurality of content descriptors, and identifying the applicable content representations comprises identifying at least one of the plurality of content descriptors that is applicable to the content based on the metadata describing the content.

13. The method of claim 12 wherein the plurality of content descriptors comprises at least one of a group consisting of: genres, time periods, and artists.

14. The method of claim 1 further comprising filtering the applicable content representations based on user preferences of the viewing user to provided filtered content representations, wherein each of the plurality of CR layers is associated with at least one of the filtered content representations.

15. The method of claim 1 wherein selecting the CR layer comprises selecting the CR layer from the plurality of CR layers based on a comparison of the distance indicia and the distance threshold of at least one of the plurality of CR layers.

16. The method of claim 1 wherein selecting the CR layer comprises selecting the CR layer from the plurality of CR layers based on comparisons of the distance indicia and the distance thresholds of multiple ones of the plurality of CR layers.

17. A method comprising:
obtaining metadata describing content made accessible by a group of hosting users;
identifying applicable content representations that are descriptive of the content from a plurality of defined content representations based on the metadata;
generating a plurality of content representation (CR) layers between the group of hosting users and a viewing user, each of the plurality of CR layers associated with at least one of the applicable content representations and having an associated distance threshold where each of the plurality of CR layers has a different content representation based on the associated distance threshold such that the at least one of the applicable content representations is based on the associated distance threshold;
obtaining distance indicia providing one of a group consisting of: a distance between avatars representing the group of hosting users and an avatar representing the viewing user and a distance between the group of hosting users and the viewing user;
selecting a CR layer from the plurality of CR layers based on the distance indicia and the distance threshold of at least one of the plurality of CR layers; and
effecting presentation to the viewing user of the at least one of the applicable content representations associated with the CR layer in association with the at least one content representation host representing the group of hosting users, wherein the at least one of the applicable content representations presented to the viewing user is presented based on the distance between the avatar representing the hosting user and the avatar representing the viewing user or the distance between the hosting user and the viewing user.

18. The method of claim 17 wherein, effecting presentation of the at least one of the applicable content representations comprises effecting presentation of the at least one of the applicable content representations associated with the CR layer in association with the avatars within a view of the virtual environment presented to the viewing user.

19. A hardware server comprising:
a communication interface communicatively coupling the server to a first client device associated with a hosting user and a second client device associated with a viewing user; and
a control system associated with the communication interface and adapted to:
obtain metadata describing content made available by the hosting user;
identify applicable content representations that are descriptive of the content from a plurality of defined content representations based on the metadata;
generate a plurality of content representation (CR) layers between the hosting user and the viewing user, each of the plurality of CR layers associated with at least one of the applicable content representations and having an associated distance threshold where each of the plurality of CR layers has a different content representation based on the associated distance threshold such that the at least one of the applicable content representations is based on the associated distance threshold;
obtain distance indicia providing one of a group consisting of: a distance between an avatar representing the hosting user and an avatar representing the viewing user and a distance between the hosting user and the viewing user;
select a CR layer from the plurality of CR layers based on the distance indicia and the distance threshold of at least one of the plurality of CR layers; and
effecting presentation of the at least one of the applicable content representations associated with the CR layer to the viewing user at the second client device in association with a content representation host representing the hosting user, wherein the at least one of the applicable content representations presented to the viewing user is presented based on the distance between the avatar representing the hosting user and the avatar representing the viewing user or the distance between the hosting user and the viewing user.

* * * * *